US010072932B2

(12) United States Patent
Cordova et al.

(10) Patent No.: US 10,072,932 B2
(45) Date of Patent: Sep. 11, 2018

(54) MOTION DETECTION SYSTEM FOR TRANSPORTATION MODE ANALYSIS

(71) Applicant: TRUEMOTION, INC., Boston, MA (US)

(72) Inventors: Brad Cordova, Cambridge, MA (US); Sanujit Sahoo, Cambridge, MA (US)

(73) Assignee: TRUEMOTION, INC., Boston, MA (US)

( * ) Notice: Subject to any disclaimer, the term of this patent is extended or adjusted under 35 U.S.C. 154(b) by 0 days.

(21) Appl. No.: 15/149,628

(22) Filed: May 9, 2016

(65) Prior Publication Data
US 2016/0327397 A1 Nov. 10, 2016

Related U.S. Application Data

(60) Provisional application No. 62/158,072, filed on May 7, 2015.

(51) Int. Cl.
*B60W 40/00* (2006.01)
*G01C 21/16* (2006.01)
(Continued)

(52) U.S. Cl.
CPC ........... *G01C 21/165* (2013.01); *B60W 40/09* (2013.01); *G06Q 40/08* (2013.01); *G08G 1/015* (2013.01); *G08G 1/123* (2013.01)

(58) Field of Classification Search
None
See application file for complete search history.

(56) References Cited

U.S. PATENT DOCUMENTS 7,209,886 B2  4/2007  Kimmel et al.
8,117,049 B2  2/2012  Berkobin et al.
(Continued)

FOREIGN PATENT DOCUMENTS

EP     3091498 A1    11/2016
WO  2012097441 A1     7/2012
(Continued)

OTHER PUBLICATIONS

Stenneth et al., Transportation Mode Detection using Mobile Phones and GIS Information, Nov. 1, 2011, ACM SIGSPATIAL GIS 2011, pp. 54-63.*
(Continued)

*Primary Examiner* — Kevin P Mahne
(74) *Attorney, Agent, or Firm* — Kilpatrick Townsend & Stockton LLP

(57) ABSTRACT

A mobile-device-based system for classifying a mode of transportation during a trip includes a mobile device including a location detection system and an accelerometer. The mobile device is configured to collect location data and acceleration data during the trip. The system also includes a data processing block configured to receive the location data from the mobile device, receive contextual data related to a plurality of transportation systems, and process the location data and at least a portion of the contextual data using a first transportation mode classifier associated with a first of the plurality of transportation systems and at least a second portion of the contextual data using a second transportation mode classifier associated with a second of the plurality of transportation systems. The data processing block is also configured to classify the mode of transportation during the trip and update the classifiers based on user input.

15 Claims, 21 Drawing Sheets

(51) Int. Cl.
*G08G 1/015* (2006.01)
*G08G 1/123* (2006.01)
*B60W 40/09* (2012.01)
*G06Q 40/08* (2012.01)

(56) References Cited

U.S. PATENT DOCUMENTS

| | | |
|---|---|---|
| 8,140,358 B1 | 3/2012 | Ling et al. |
| 8,165,916 B2 | 4/2012 | Hoffberg et al. |
| 8,284,039 B2 | 10/2012 | Baker et al. |
| 8,285,439 B2 | 10/2012 | Hodges et al. |
| 8,296,007 B2 | 10/2012 | Swaminathan et al. |
| 8,311,858 B2 | 11/2012 | Everett et al. |
| 8,527,013 B2 | 9/2013 | Guba et al. |
| 8,595,034 B2 | 11/2013 | Bauer et al. |
| 8,862,486 B2 | 10/2014 | Cordova et al. |
| 9,055,407 B1 | 6/2015 | Howard et al. |
| 9,141,995 B1 | 9/2015 | Brinkmann et al. |
| 2004/0236596 A1 | 11/2004 | Chowdhary et al. |
| 2004/0252027 A1 | 12/2004 | Torkkola et al. |
| 2007/0136107 A1 | 6/2007 | Maguire et al. |
| 2008/0065427 A1 | 3/2008 | Helitzer et al. |
| 2008/0154629 A1 | 6/2008 | Breed et al. |
| 2009/0043449 A1 | 2/2009 | Matsuura et al. |
| 2009/0197619 A1* | 8/2009 | Colligan ............ G06Q 30/02 455/456.3 |
| 2009/0216704 A1* | 8/2009 | Zheng ............... G01C 21/20 706/52 |
| 2010/0131304 A1 | 5/2010 | Collopy et al. |
| 2010/0205012 A1 | 8/2010 | McClellan et al. |
| 2010/0292921 A1* | 11/2010 | Zachariah .......... G06Q 10/00 701/533 |
| 2011/0112759 A1* | 5/2011 | Bast ................. G01C 21/3423 701/533 |
| 2011/0125394 A1 | 5/2011 | Horstemeyer |
| 2011/0153367 A1 | 6/2011 | Amigo et al. |
| 2011/0275321 A1 | 11/2011 | Zhou et al. |
| 2011/0294520 A1 | 12/2011 | Zhou et al. |
| 2012/0028624 A1 | 2/2012 | Jedlicka |
| 2012/0066251 A1* | 3/2012 | Gontmakher ..... G06F 17/30241 707/769 |
| 2012/0071151 A1 | 3/2012 | Abramson et al. |
| 2012/0072244 A1 | 3/2012 | Collins et al. |
| 2012/0150651 A1 | 6/2012 | Hoffberg et al. |
| 2012/0197669 A1 | 8/2012 | Kote et al. |
| 2012/0209634 A1 | 8/2012 | Ling et al. |
| 2012/0214463 A1 | 8/2012 | Smith et al. |
| 2012/0296885 A1* | 11/2012 | Gontmakher ......... G08G 1/127 707/705 |
| 2012/0303392 A1 | 11/2012 | Depura et al. |
| 2012/0310587 A1 | 12/2012 | Tu et al. |
| 2012/0316913 A1 | 12/2012 | Reyes |
| 2013/0006674 A1 | 1/2013 | Bowne et al. |
| 2013/0046562 A1 | 2/2013 | Taylor et al. |
| 2013/0238241 A1* | 9/2013 | Chelotti ............ G01C 21/3617 701/533 |
| 2014/0108058 A1 | 4/2014 | Bourne et al. |
| 2014/0149145 A1 | 5/2014 | Peng et al. |
| 2014/0180730 A1* | 6/2014 | Cordova ............... G07C 5/085 705/4 |
| 2014/0180731 A1 | 6/2014 | Cordova et al. |
| 2014/0222253 A1 | 8/2014 | Siegel et al. |
| 2014/0324745 A1 | 10/2014 | Leppänen et al. |
| 2014/0370919 A1 | 12/2014 | Cordova et al. |
| 2015/0170030 A1 | 6/2015 | Maennel |
| 2015/0186714 A1 | 7/2015 | Ren et al. |
| 2015/0296334 A1* | 10/2015 | Smyrk ................ G06Q 50/30 455/456.3 |
| 2016/0046298 A1 | 2/2016 | Deruyck et al. |
| 2016/0051167 A1 | 2/2016 | Saha et al. |
| 2016/0066155 A1* | 3/2016 | Fan ..................... G06F 3/0484 455/457 |
| 2016/0127486 A1* | 5/2016 | Chen ................ G06F 3/04817 709/206 |
| 2016/0379141 A1* | 12/2016 | Judge ............... G06Q 20/0453 705/5 |
| 2017/0210290 A1 | 7/2017 | Cordova et al. |
| 2017/0349182 A1 | 12/2017 | Cordova et al. |

FOREIGN PATENT DOCUMENTS

| | | |
|---|---|---|
| WO | 2014105846 A2 | 7/2014 |
| WO | 2014105846 A3 | 10/2014 |

OTHER PUBLICATIONS

Beljecki et al., Transportation mode-based segmentation and classification of movement trajectories, Oct. 19, 2012 (published), International Journal of Geographical Information Science, vol. 27, Issue 2, pp. 1-28.*

EP16168772.8, "Extended European Search Report", dated Aug. 31, 2016, 9 pages.

U.S. Appl. No. 15/413,005, "Final Office Action", dated Feb. 1, 2018, 16 pages.

U.S. Appl. No. 15/413,005, "Non-Final Office Action", dated Jun. 16, 2017, 16 pages.

* cited by examiner

US 10,072,932 B2

MOTION DETECTION SYSTEM FOR TRANSPORTATION MODE ANALYSIS

CROSS-REFERENCES TO RELATED APPLICATIONS

This application claims priority to U.S. Provisional Patent Application No. 62/158,072, filed on May 7, 2015, entitled "Method and System for Determining Modes of Transportation," the disclosure of which is hereby incorporated by reference in its entirety for all purposes.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device.

In order to use mobile devices to track drivers as they are driving in cars, as well as their driving behaviors, it is helpful to determine the transportation mode of the user of the mobile device as a function of time, for example, whether the person is, walking, biking, driving, or the like. Despite the progress made in relation to providing data related to drivers and their vehicles, there is a need in the art for improved methods and systems related to determining modes of transportation that are utilized by users of mobile devices.

SUMMARY OF THE INVENTION

Embodiments of the present invention relate to transportation systems. More particularly, embodiments relate to methods and systems to determine modes of transportation used by a user having a mobile device. In a particular embodiment, location data collected using a mobile device is analyzed to determine the mode of transportation for a user during a trip. The invention has wide applicability, including determining modes of transportation suitable for use in computing insurance rates, insurance risks, and the like.

A mobile-device-based system for classifying a mode of transportation during a trip is provided. The system includes a mobile device including a location detection system and an accelerometer. The mobile device is configured to collect location data and acceleration data during the trip. The system also includes a data processing block configured to receive the location data from the mobile device and receive contextual data related to a plurality of transportation systems. The data processing blocks is also configured to process the location data and at least a portion of the contextual data using a first transportation mode classifier associated with a first of the plurality of transportation systems, process the location data and at least a second portion of the contextual data using a second transportation mode classifier associated with a second of the plurality of transportation systems, receive a first transportation mode metric from the first transportation mode classifier, and receive a second transportation mode metric from the second transportation mode classifier. The data processing block is further configured to classify the mode of transportation during the trip based on the greater of the first transportation mode metric or the second transportation mode metric, display the classified mode of transportation to a user, receive a verification of the classified mode of transportation from the user, and update at least one of the first transportation mode classifier or the second transportation mode classifier based on the received verification.

According to an embodiment of the present invention, a method of determining a mode of transportation is provided. The method includes receiving trip data, receiving contextual data related to a transportation system, and forming one or more segments using the trip data. The method also includes determining if at least one of the one or more segments is not associated with an airplane and determining if the at least one of the one or more segments is not associated with a train. The method further includes determining if the at least one of the one or more segments is not associated with a bus and marking the at least one of the one or more segments as associated with a car.

According to another embodiment of the present invention, a method of analyzing trip data is provided. The method includes receiving trip data, accessing train system data including train track data and train schedule data, and computing a correlation between the trip data and the train track data. The method further includes determining that the correlation between the trip data and the train track data is greater than a first threshold, computing a correlation between the trip data and the train schedule data, and determining that the correlation between the trip data and the train schedule data is greater than a second threshold. The method further includes associating the trip data with train travel.

Numerous benefits are achieved by way of the present invention over conventional techniques. For example, embodiments of the present invention provide an accurate method of building a risk profile for a driver. By utilizing embodiments of the present invention, methods and systems are provided that determine the mode of transportation used during a trip. Accordingly, only trips made when the user is in a car can be separated from trips made using other modes of transportation, thereby increasing the accuracy of the driver's risk profile. These and other embodiments of the invention along with many of its advantages and features are described in more detail in conjunction with the text below and attached figures.

DETAILED DESCRIPTION OF SPECIFIC EMBODIMENTS

Figure 1:
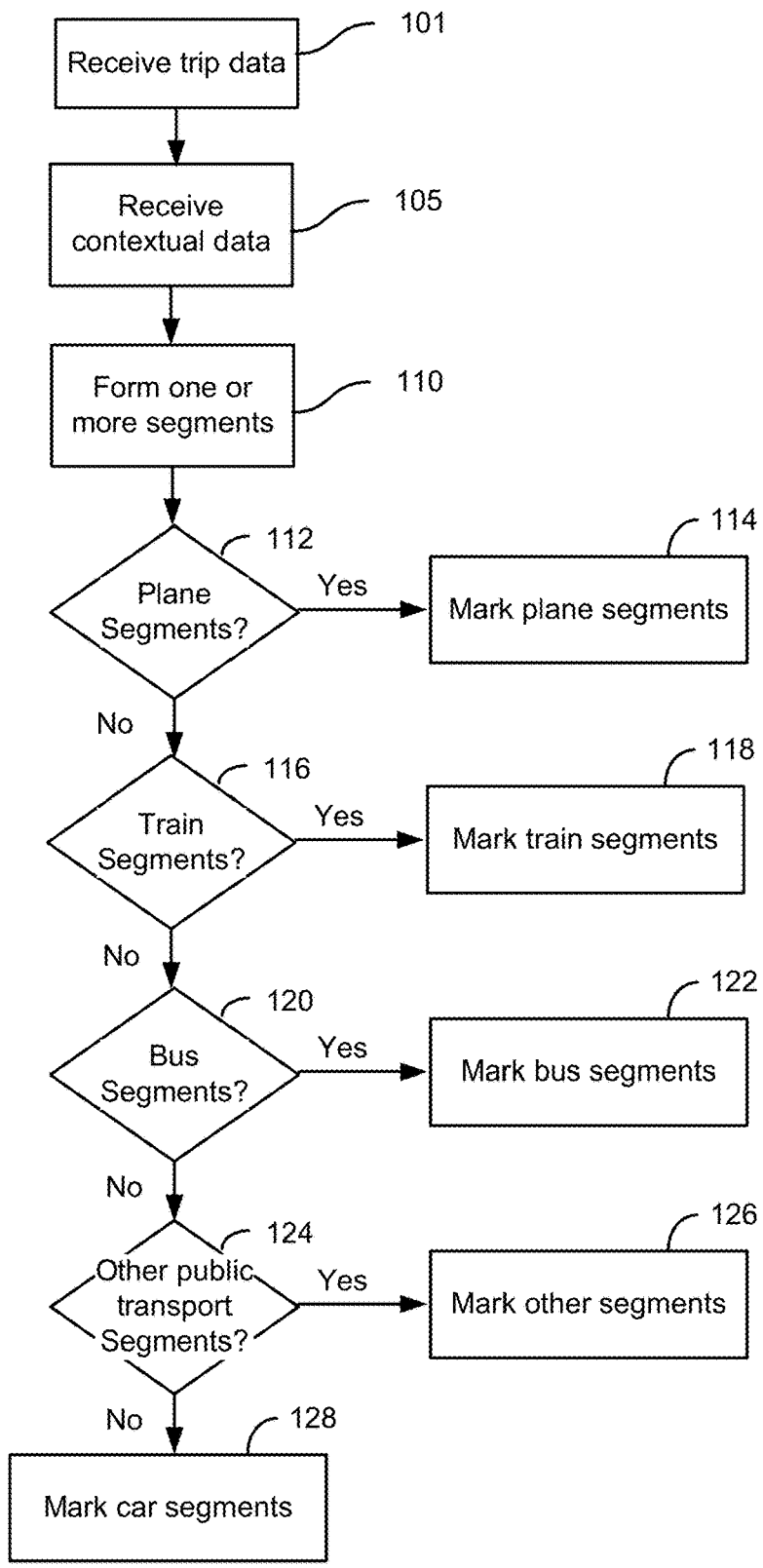
FIG. 1 is a simplified flowchart illustrating a method of determining modes of transportation during a trip according to an embodiment of the present invention.

Embodiments of the present invention relate to transportation systems. More particularly, embodiments relate to methods and systems to determine modes of transportation used by a user having a mobile device. In a particular embodiment, location data collected using a mobile device is analyzed to determine the mode of transportation for a user during a trip. The invention has wide applicability, including determining modes of transportation suitable for use in computing insurance rates, insurance risks, and the like.

Embodiments of the present invention utilize mobile devices to provide information on user's behaviors during transportation. For example, a mobile device carried by a user could be used to analyze driving habits, which is of interest for insurance coverage and the like. In order to determine risk models based on driving behaviors, it is helpful to filter out data associated with the user (i.e., a driver) that is not related to driving events. As an example, if the person uses public transportation, such as a bus, ferry, subway, or train, travel using these modes of transportation should not be included with data related to driving events during which the person is driving. If, for instance, data collected when the person is riding in a bus, which may share some similarities to data collected when the person is driving, should be filtered out and not used in analyzing the person's driving behaviors. Having filtered out all modes of transportation other than by car, the person's driving behaviors can be analyzed accurately.

As an example, if a person carries a mobile device with them and enters a vehicle as a driver, some embodiments described herein can estimate a high likelihood that a driving event, also referred to as a drive, is taking place and operate the sensors on the mobile device to collect data without manipulation of the device by the user. After the driving event (i.e., the drive) ends, some embodiments can estimate the likelihood that the drive has ended and cease operation of the sensors on the mobile device. Estimates of the likelihood of a drive can be assisted by the creation of a model of driving likelihood for a particular driver associated with the mobile device (also termed herein as a driving model). Embodiments can improve the collection of driving data by modeling the environment in which a user is operating, and using high-frequency data collection when the user is likely to be driving or about to drive.

A variety of modes of transportation are amenable to use according to embodiments of the present invention, including, without limitation, walking, riding a bus, driving a car, riding in a car as a passenger, riding in a train, taking the subway, riding a bike, and the like. A trip can be considered as a collection of points (e.g., locations defined by a latitude, longitude, and a time-stamp), segments (e.g., a collection of points, including the route between adjacent points) and stages (e.g., a group of segments), all of which are characterized by being in the same temporal vicinity. Points can be referred to as GPS points, with the location referenced to GPS locations.

The stages can be defined to begin and end when a change from one mode of transport to another is detected or when there is a change in vehicle of the same mode of transport. These stage transitions can be referenced by transition points, which are points (e.g., latitude/longitude location and time-stamp) associated with the stage transition.

FIG. 1 is a simplified flowchart illustrating a method of determining modes of transportation during a trip according to an embodiment of the present invention. The method illustrated in FIG. 1 utilizes contextual data to remove non-driving modes of transportation from segments of the trip, resulting in the determination of driving segments during the trip. If the trip consists of solely a non-driving modes, then the trip can be identified as such and not used to analyze the user's driving behaviors.

In the embodiments illustrated in FIG. 1, contextual data, also referred to as contextual map data, is utilized in determining the modes of transportation during a trip. The contextual map data can be stored in a database that includes data related to transportation systems, including roads, trains, buses, bodies of water, and the like. As an example, location data related to trains could include locations of train stations, locations of train tracks, timetables and schedules, and the like. Furthermore, location data related to a bus system could include bus routes, bus schedules, bus stops, and the like.

Referring to FIG. 1, the method includes receiving trip data (101) and receiving contextual data (105). Typically, the trip data is measured using a mobile device, such as a smart phone. The trip data can include location data (e.g., GPS data) as a function of time, accelerometer data, combinations thereof, or the like. In some embodiments, in order to prolong battery life, only location/GPS data is utilized, whereas in other embodiments, the location data is supplemented with accelerometer data. One of ordinary skill in the art would recognize many variations, modifications, and alternatives. The contextual data related to the transportation system is described more fully throughout the specification.

In an embodiment, the trip data is analyzed to determine when stops are present in the trip data. As an example, using a mobile device, the velocity of the mobile device can be determined by analyzing the location data as a function of time. When the velocity of the mobile device drops below a threshold or is equal to zero for a predetermined period of time, a stop in the trip data can be determined. Thus, a trip can be broken down into segments based on the speed of the user. Wherever the measured speed is close to zero, the corresponding GPS point marks the beginning or end of a segment. Once the segments have been created, algorithms can be used as described below to determine the mode of transportation for the segment. In some embodiments, the segments are then grouped based on the determined mode to form stages.

Accordingly, segments can be formed by defining the segments as time periods between stops in the trip data (110). Accordingly, for a given trip, a number of segments can be formed, with each segment separated by a stop in the trip data. As an example, if a person using the mobile device is riding on a bus, every time the bus stops can be defined as a segment. As described below, the contextual data can be used to determine that one or more of the segments are associated with a bus and the segments can be marked as bus segments. As contiguous segments are associated with a bus, a stage can be formed by linking together contiguous segments to form a stage of the trip associated with travel on a bus. Other modes of transportation can be defined based on segments and stages as well. In some embodiments, segments and stages can be associated with differing modes of transportation, such as walking before and after a bus stage.

The method also includes determining if segments of the trip are associated with planes (112) and removing these segments of the trip that are associated with airplanes. As described more fully below, segments are analyzed so that segments not associated with car travel (for example, starting with plane segments) are removed from the data set, leaving a data set only including car segments. Accordingly, driving data can be separated from other modes of transportation and driving behavior can be analyzed.

Returning to the classification performed in element 112, the contextual data received in element 105 includes locations of airports, airport runways, and the like. The location of the points in the trip are compared to the locations associated with airports, which can be represented by airport polygons. Although a taxiing plane can be characterized by speeds comparable to vehicle traffic, the location of the taxiing plane on a runway enables these points in the trip to be removed from the data set as a non-driving event. Thus, both location and vehicle speed as determined using the mobile device can be used to determine that a segment of a trip is associated with a plane. In some embodiments, the segment/stage of the trip associated with an airplane are marked accordingly.

The segments of the trip that are associated with planes are marked accordingly (114). If the trip data does not include any segments associated with a plane, then the method proceeds to determinations related to other modes of public transportation. In some embodiments, the plane segments can be combined to form plane stages, but this is not required by the present invention.

The method also includes determining if segments of the trip are associated with trains (116) and removing segments of the trip associated with trains. According to embodiments of the present invention, the category of trains can include various rail-based transportation systems, including commuter trains, light rail, subways, elevated-track trains, and the like. Accordingly, the use of the term "train" should be understood to include these rail-based transportation systems.

As discussed more fully in relation to FIG. 6 below, data about the trip is used in conjunction with contextual data to determine segments of the trip that are associated with train travel and segments that are not associated with train travel.

Although a train can move at speeds comparable to vehicle traffic, the location of the train tracks enables these points in the trip to be removed from the data set as a non-driving event. In the embodiment illustrated in FIG. 1, the segments/stages of the trip associated with a train are marked accordingly (118). If the trip data does not include any segments associated with a train, then the method proceeds to determinations related to other modes of public transportation.

It should be appreciated that the specific steps illustrated in FIG. 1 provide a particular method of determining modes of transportation during a trip according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
FIG. 2 is a map illustrating a route of a car during a trip according to an embodiment of the present invention.
Figure 3:
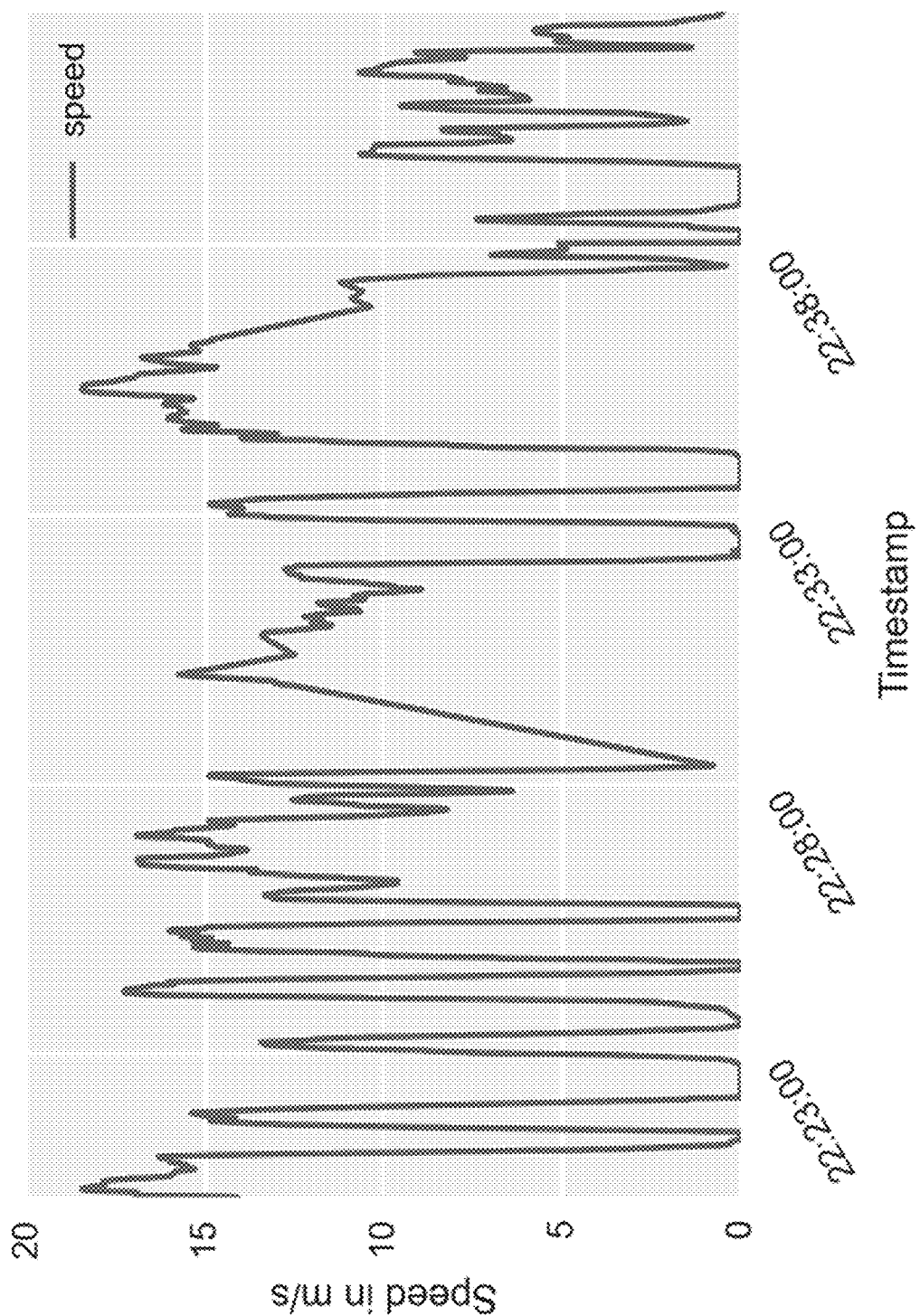
FIG. 3 is plot illustrating vehicle speed as a function of time for the trip illustrated in FIG. 2.

FIG. 2 is a map illustrating a route of a car during a trip according to an embodiment of the present invention. FIG. 3 is plot illustrating vehicle speed as a function of time for the trip illustrated in FIG. 2. As illustrated in FIG. 2, the route of a car varies depending on the streets, highways, and the like that the car takes during the trip. As illustrated in FIG. 3, location data (e.g., GPS data) collected using the location determination system 1810 of the mobile device can be used to generate vehicle speed data for the trip. The speed data, in conjunction with the map, can be used to identify segments of the trip as associated with car travel, as well as to distinguish travel in a car with other modes of transportation.

Figure 4:
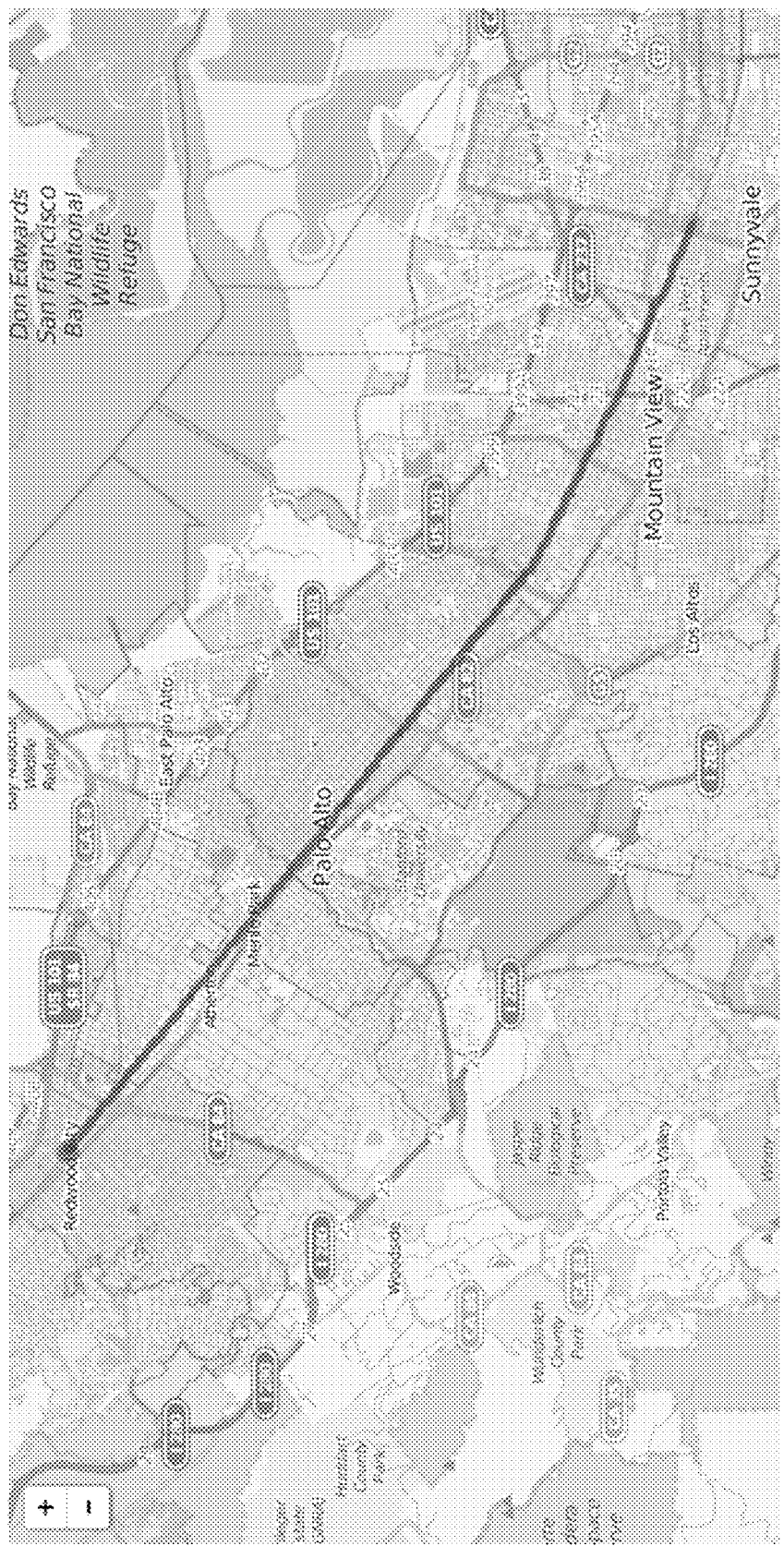
FIG. 4 is a map illustrating a route of a train during a trip according to an embodiment of the present invention.
Figure 5:
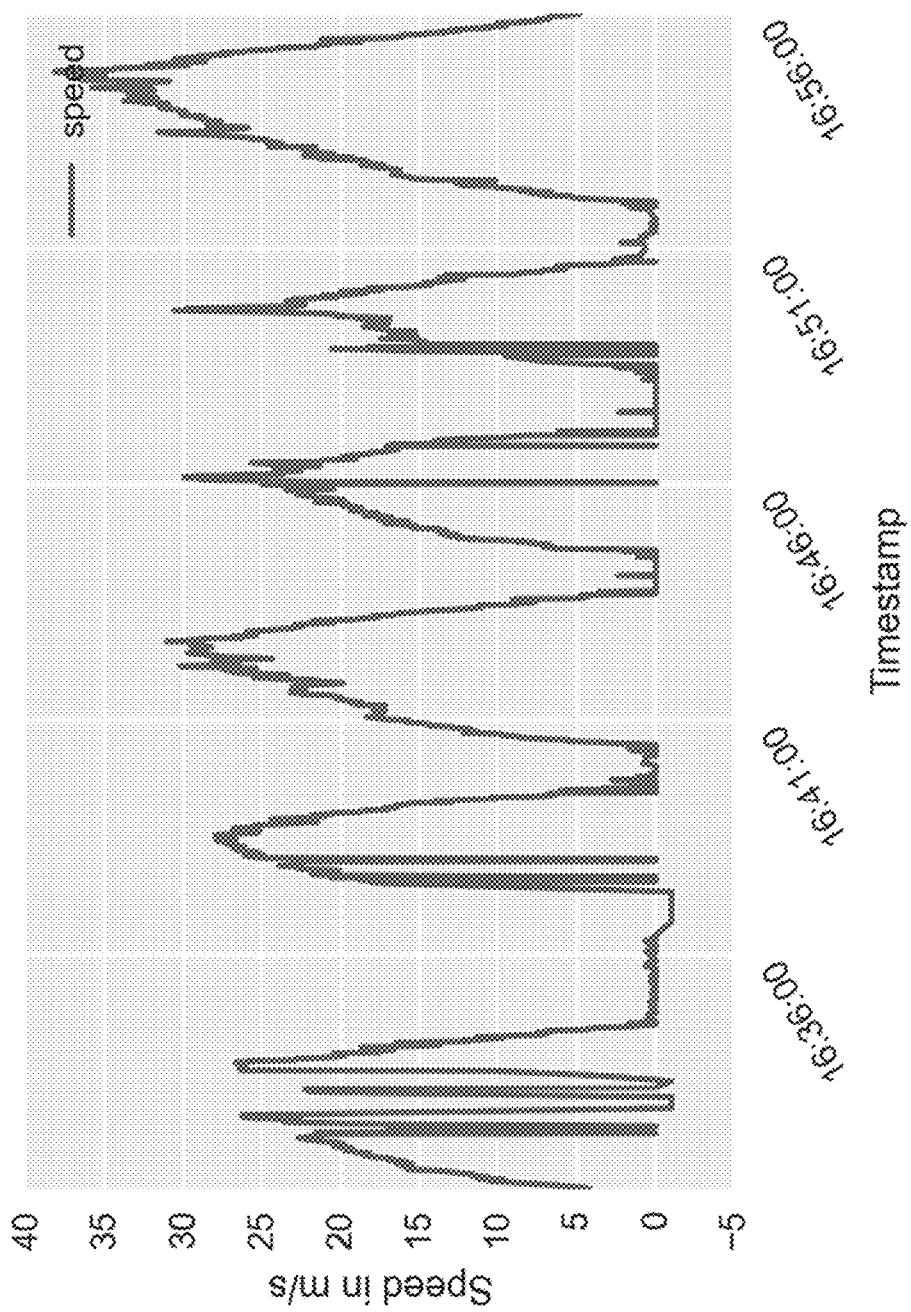
FIG. 5 is plot illustrating vehicle speed as a function of time for the trip illustrated in FIG. 4.

FIG. 4 is a map illustrating a route of a train during a trip according to an embodiment of the present invention. FIG. 5 is plot illustrating train speed as a function of time for the trip illustrated in FIG. 4. Referring to FIG. 4, a map of a train route can be overlaid with location data, e.g., GPS location data, collected using the mobile device. As shown in FIG. 4, the course of the train is predictable since it is defined by the train tracks. In comparison, the course of the car in FIG. 2 varies depending on the particular roads selected. Referring to FIG. 5, the speed of the train tends to follow a consistent pattern of acceleration as it leaves the station, reaching a top speed, and decelerating as it approaches the next station. The time stamps illustrated in FIG. 5 show the train stops at the various stations, enabling a distinction between the temporal nature of a train segment and the temporal nature of a car segment. For comparison, the consistent pattern evident in FIG. 5 is missing from FIG. 3, in which the car is stopped at intersections and the like for different times, and the like.

Some embodiments of the present invention utilize the speed of travel in combination with the course to determine the mode of transport. In these embodiments, using the time-stamped location signal, the mode of transportation can be determined, even in the absence of contextual data. As an example, cars tend to turn more quickly than trains and subways, that is, vehicles such as cars can take turns at a much faster rate than trains/subways. This characteristic is reflected in the course data. If for a trip, the rate of change of course stays low then the probability of it being a train/subway is higher.

Accordingly, the direction of travel and lateral acceleration data can be analyzed to determine the likelihood that the segment in question is associated with a car rather than a train or subway, with higher lateral acceleration data indicating a higher likelihood that the segment is associated with a car rather than a train. As discussed in relation to element 630 below, analysis of the temporal data profile can include analysis of the acceleration patterns, variation in course, and other data in addition to analysis of the contextual data discussed in relation to element 614.

Figure 6:
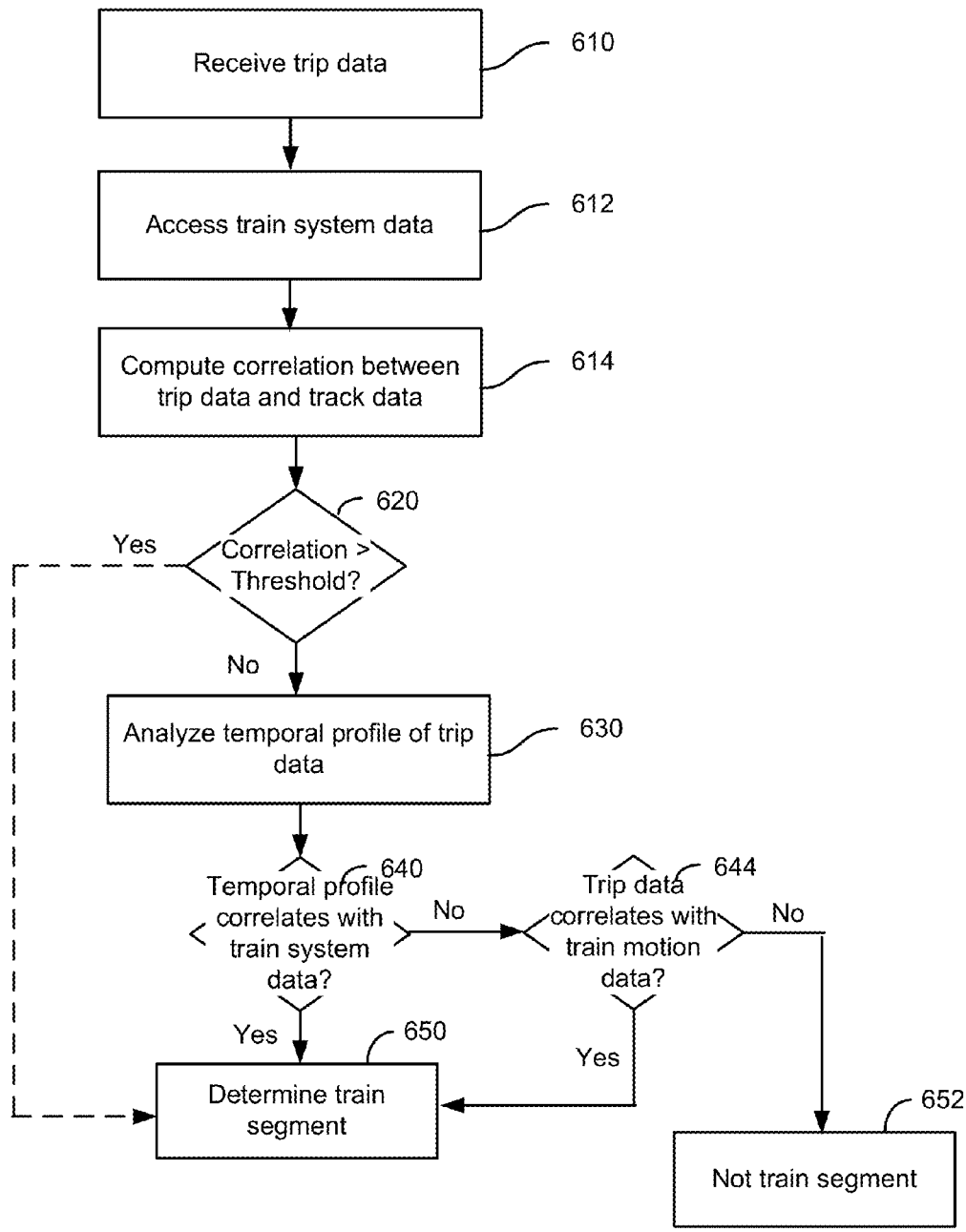
FIG. 6 is simplified flowchart illustrating a method of determining that a segment of a trip is associated with a train according to an embodiment of the present invention.

FIG. 6 is simplified flowchart illustrating a method of determining that a segment of a trip is associated with a train according to an embodiment of the present invention. In some embodiments, the method illustrated in FIG. 6 is implemented as the decision process 116 in FIG. 1. The method includes receiving trip data 610 and accessing train track data (612). In some embodiments, the trip data received at 110 can be used, in which case the trip data at 610 is an optional step. The trip data can be previously segmented or can be segmented as part of the process of receiving the trip data. The train system data, which can be considered as an element of the contextual data already discussed, can include data including location of train stations, location of train tracks, train schedules, information on timing of safety equipment, such as the closing and opening of train crossing guards, and the like.

The method includes computing a correlation between the trip data and the track data (614). Accordingly, the location of the points in the trip (e.g., with the segments associated with planes previously removed) can be compared to the locations associated with the train system stored as contextual data. In some embodiments, the location of the train tracks can compared to the location of the points in the trip data and the difference in locations are determined and compared to a distance threshold (e.g., less than 3 meters, less than 1.5 meters, or the like). If the correlation is greater than the threshold (e.g., if the distances are less than a distance threshold) for a predetermined portion of the segment, then the determination is made that the segments are associated with a train (620) and the method determines that the segment is associated with a train (650). This determination can be optional for methods that also consider temporal data before determining that the segment is associated with a train. If the correlation is not greater than the threshold, then the method proceeds to analyze the temporal profile associated with the segment. As an example, the threshold for comparison could be 90%, with the determination of a trip segment being defined by the location of the train tracks and the location of the points in the trip being within a distance threshold over more than 90% of the trip. In some embodiments, the track data may not be fully populated, which can result in a low correlation between the trip data and track data, even if the trip is made on a train. In these cases, the temporal data and train motion data discussed below can be utilized to aid in the determination that the trip data is associated with train travel.

The method also includes analyzing the temporal profile of the trip data (630) in some process flows. In an embodiment, the time that the train is stopped is compared with the scheduled stops in the train schedule to determine a correlation between these times. In other embodiments, the locations during which the trip data has a zero speed are compared to the locations of the train station. Thus, the temporal profile of the trip data is analyzed to determine if the stops in the trip data correlate with the locations of the train stations. If the stops correlate with train stations, for example, either by overlap between zero speed in the trip data and train station locations or by the timestamps at which the speed is zero and the train schedule, combinations thereof, or the like, then the determination is made (640) that the segment is associated with train travel (650).

If the temporal profile of the trip does not correlate with the train system, then an additional analysis can be performed to determine if the trip data correlates with train motion data (644). As discussed above, the course data can be analyzed to compare the variation in course with different modes of transportation, the acceleration data can be analyzed, and the like, to determine the mode of transportation if the contextual method utilized in relation to elements 620 and 640 was not definitive. Thus, element 644 enables an analysis of the trip data, for example, segment data, to compare the trip data to data associated with train motion data. As an example, the suspension systems on trains, the presence of joints in the track, and the like, result in motion data collected on a train differing from motion data associated with other modes of transportations, such as planes and buses. In some embodiments, some or all of the various types of temporal trip data are compared to data characteristic of train travel.

This analysis is also applicable to the other modes of transportation. If you compare a bus and a car, for instance, the bus is heavier and longer and has a different suspension design, so the vibrations in the motion will be different. Accordingly, each form of transportation will have a different motion and acceleration fingerprint that can distinguish the trip data for a bus or train from that associated with a car. In some implementations, a machine learning classifier is used to distinguish these difference based on the accelerations that the particular mode of transportation expresses.

If the trip data does not correlate with train motion data, then the decision is made that the segment is not associated with train travel (652). In some implementations, element 644 is optional since the contextual data analysis provides sufficiently accurate results for the particular implementation.

It should be appreciated that the specific steps illustrated in FIG. 6 provide a particular method of determining that a segment of a trip is associated with a train according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 1, the method includes determining if segments of the trip are associated with bus travel (120). Thus, as shown in FIG. 1, in a manner similar to the removal of plane and train segments, the method includes determining if segments of the trip are associated with bus travel (120) and then marking (and removing) these segments of the trip as being associated with buses (122).

Figure 7:
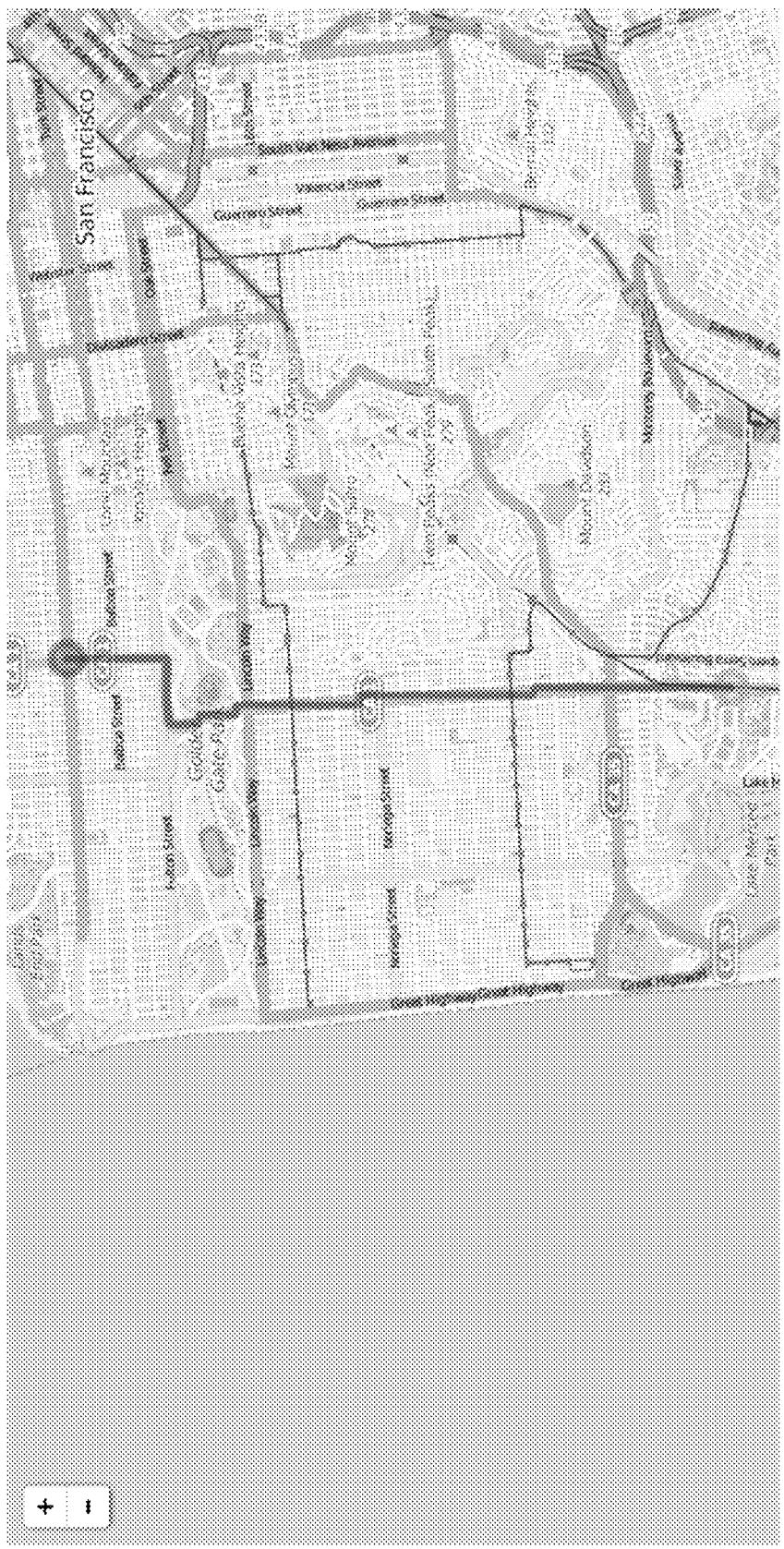
FIG. 7 is a map illustrating a route of a bus during a trip according to an embodiment of the present invention.

FIG. 7 is a map illustrating a route of a bus during a trip according to an embodiment of the present invention. FIG.

Figure 8:
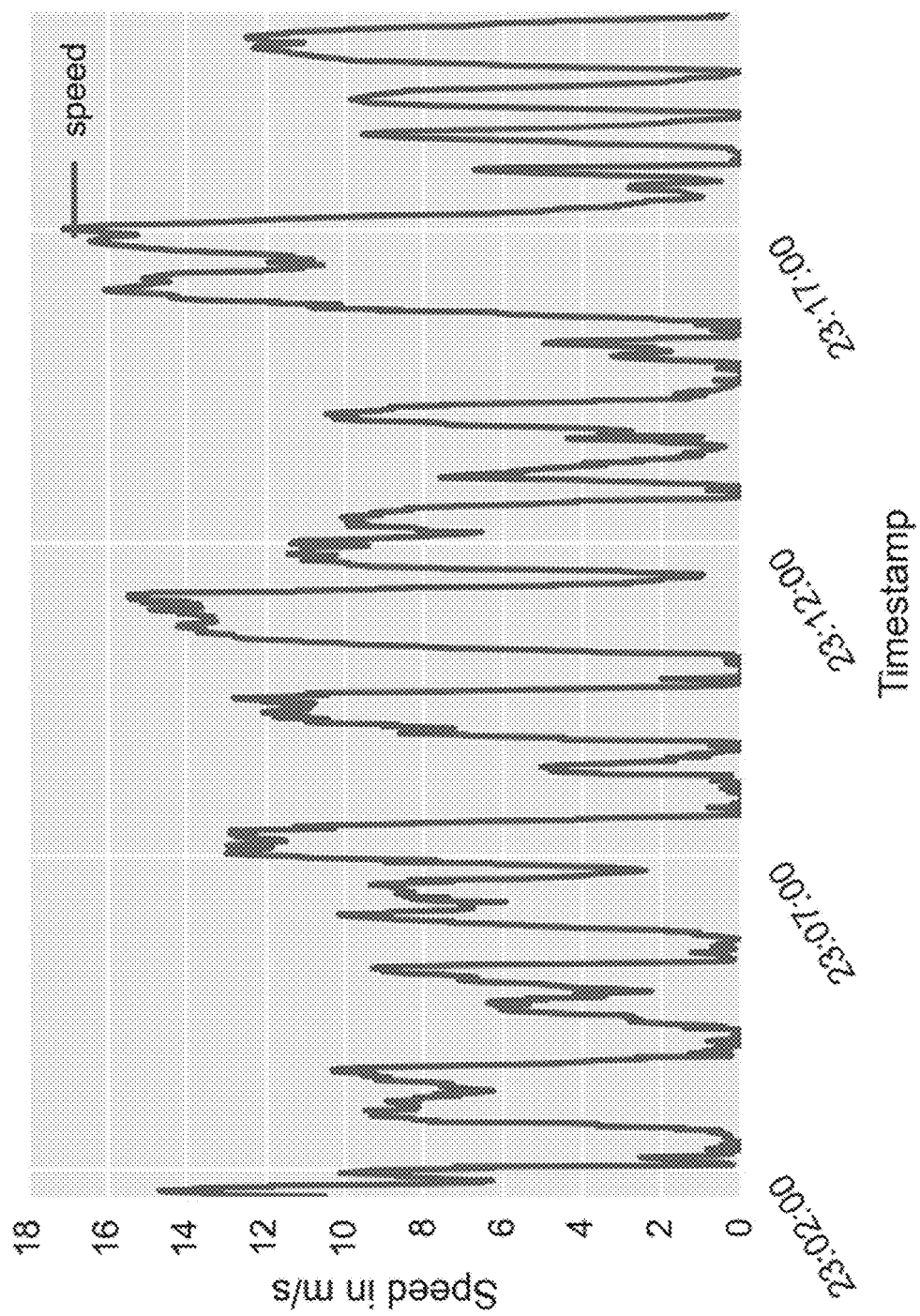
FIG. 8 is plot illustrating vehicle speed as a function of time for the trip illustrated in FIG. 7.

8 is plot illustrating bus speed as a function of time for the trip illustrated in FIG. 7. As illustrated in FIG. 7, the mapping of the bus' travel follows a predetermined path defined by the bus route and as illustrated in FIG. 8, the temporal profile of the bus' travel shares some similarities with the train's temporal profile, but also shares some similarities with the car's travel.

Figure 9:
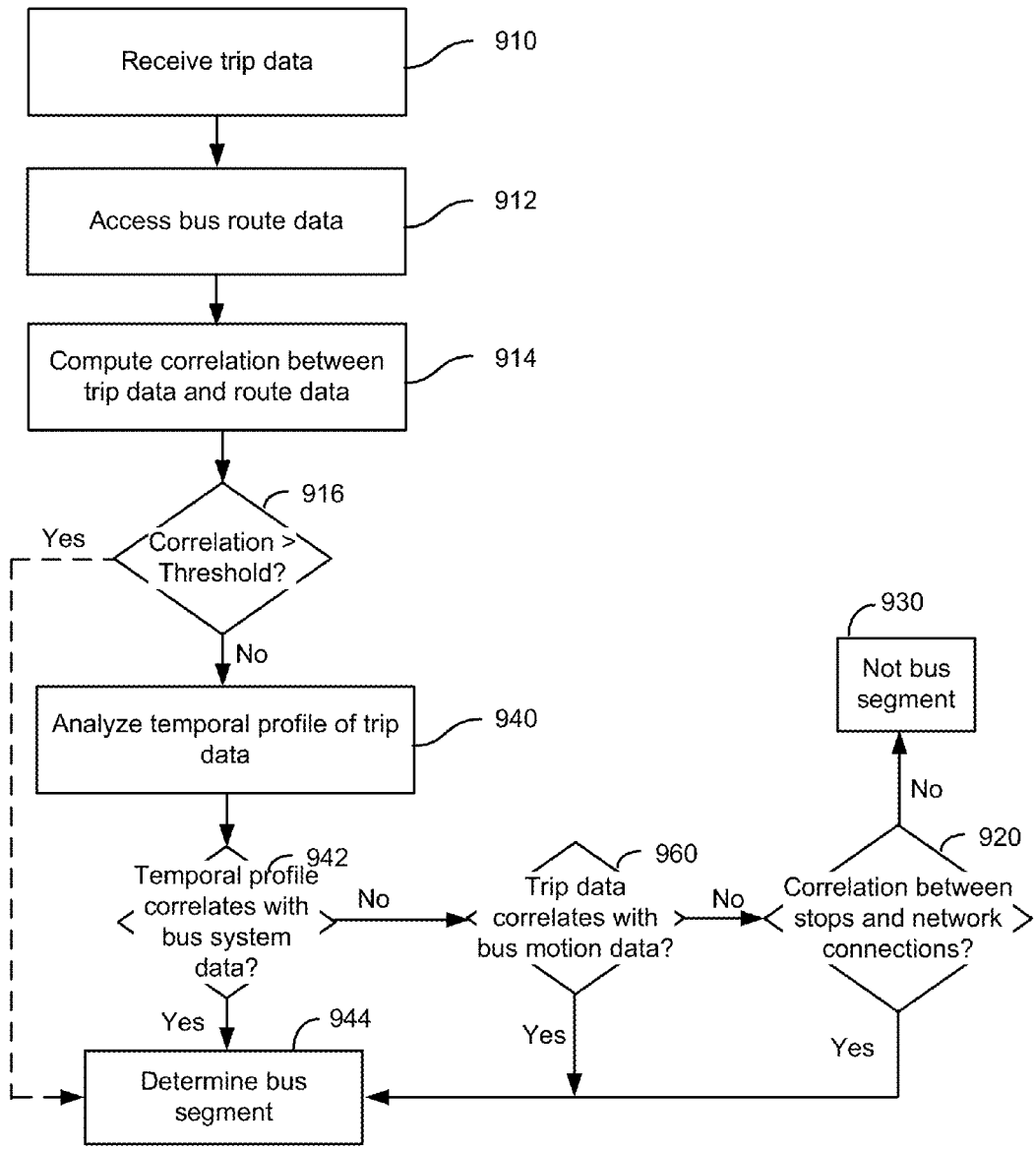
FIG. 9 is a simplified flowchart illustrating a method of determining that a segment of a trip is associated with a bus according to an embodiment of the present invention.

FIG. 9 is a simplified flowchart illustrating a method of determining that a segment of a trip is associated with a bus according to an embodiment of the present invention. The method includes receiving trip data (910) and accessing bus route data (912). In some embodiments, the trip data received at 110 can be used, in which case the trip data at 910 is an optional step. The trip data can be segmented based on stops in the trip data and the segments can be compared to the route data. The bus route data, which can be considered as an element of the contextual data already discussed, can include data including location of bus stations, bus routes, locations of bus stops, bus schedules, and the like.

A correlation is computed between the trip data and the bus route data (914). As an example, the location of the points in the trip (e.g., with the segments associated with planes/trains removed) are compared to the locations associated with buses. As discussed in relation to the analysis related to train tracks, differences less than a threshold can indicate that the mobile device is traveling along a bus route, indicating that the segment of the trip may be associated with bus travel. If the correlation exceeds a predetermined threshold, then a determination can be made that the trip data is associated with a bus segment. This determination is optional.

In addition to location information, the temporal data associated with the segments can be analyzed (940) to determine if the correlation between the temporal data and the bus system data is greater than a threshold (942). As an example, time-stamps of the points can be compared to bus schedules to determine the likelihood that the person is traveling on a bus. Although buses typically move at speeds comparable to other vehicle traffic on the road, the contextual data can be used, for example, the location of the bus route, the timing of the bus route, stopping at bus stops, and the like to mark and remove the segments associated with buses from the data set as a non-driving event. If both the location data and the temporal data were correlated with the bus system data, then the segment can be marked as a bus segment (944). As discussed in relation to element 644 in FIG. 6, the trip data can be correlated with bus motion data (960) to determine if a high correlation exists for the trip data and data characteristic of the motion of a bus. If a high correlation is determined, then the segment can be marked as a bus segment (944).

In some cases, the correlation between stops (points between segments) and network connections, for example, bus stops, can be analyzed to determine if the segment is a bus segment. This correlation can be determined across multiple routes, not just a single route. If the correlation between stops and network locations is low, then the determination is made (920) that the segments adjacent the stop are not bus segments. A high correlation can indicate that one or more of the segments adjacent the stop are associated with travel on a bus.

It should be appreciated that the specific steps illustrated in FIG. 9 provide a particular method of determining that a segment of a trip is associated with a bus according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 8 is a plot illustrating bus speed and acceleration as a function of time according to an embodiment of the present invention. FIG. 8 provides data for a bus, although the discussion is applicable to other vehicles. As illustrated in FIG. 8, the speed of the bus is tracked, for example, using GPS data from a mobile device in the bus. The speed is zero at some points in time, associated with a bus stop, and increases to a larger value as the bus moves between stops. The acceleration data also demonstrates that the acceleration is zero at times when the bus is stopped at the bus stops and varies between positive and negative values as the bus moves between bus stops. Thus, at approximately 23:08, the bus is stopped at a bus stop. The GPS location of the mobile device can be used to provide the location and correlate these locations with known bus stops. Accordingly, the mode of transportation as a bus can be determined using embodiments of the present invention based on the contextual GPS data collected by embodiments of the present invention.

The contextual methods discussed herein can utilize one or more of the following algorithms to determine the mode of transportation, including closeness of the location data and the average rail line trajectory, closeness of the location data and train station locations, closeness of the location data and the average bus route trajectory, closeness of the location data and bus stop locations, average accuracy of location data (e.g., GPS coordinates), and the like. These algorithms can be either static (e.g., based on fixed data sets related to public transport systems) or can be dynamic (e.g., based on real-time data about public transport assets including buses, trains, and the like). In the static cases, the location data is compared to data about the system, such as train station location. In the dynamic cases, the location data is compared to data about the system assets, such as the location of the trains in the system.

It should be noted that the methods discussed herein are applicable to a variety of modes of transportation, including subways. The combined use of location (e.g., GPS) data and acceleration data can be used, for example, in subway applications, to determine that the user is traveling on a subway (in contrast with a train) since the location data will be lost when the subway goes underground, but the accelerometer data will continue to show motion of the subway. In this way, subways that travel partially above ground and partially below ground can be distinguished from trains and light rail that travel above ground almost exclusively or exclusively. As an example, the location (e.g., GPS) data can be correlated with stops associated with the subway stations. Above ground, the behavior of trains and subways will be similar. For the subway, there will be times when the GPS signal is lost as the subway travels underground, but the acceleration profiles correlate with a train, for example, accelerating, constant velocity, and then decelerating at the next stop. The loss of the location signal can be used in distinguishing these different modes of transportation.

Although FIG. 1 has been discussed in relation to making various segments as associated with particular public transportation systems, these particular groupings are not required by the present invention and the system could return an indicator, set a flag, or the like to indicate that a mode of public transportation has been used, indicating that the trip data should not be associated with a user's personal transportation, such as a car. Additionally, some methods can remove personal transportation such as bicycles that are not of interest, using for example, speed data that is below given thresholds.

Moreover, although FIG. 1 illustrates the determinations of the modes of transportation as being performed in series, this is not required by the present invention and the various determination can be done in parallel in some implementations, or a combination of various stages of serial/parallel processing. One of ordinary skill in the art would recognize many variations, modifications, and alternatives.

Figure 10:
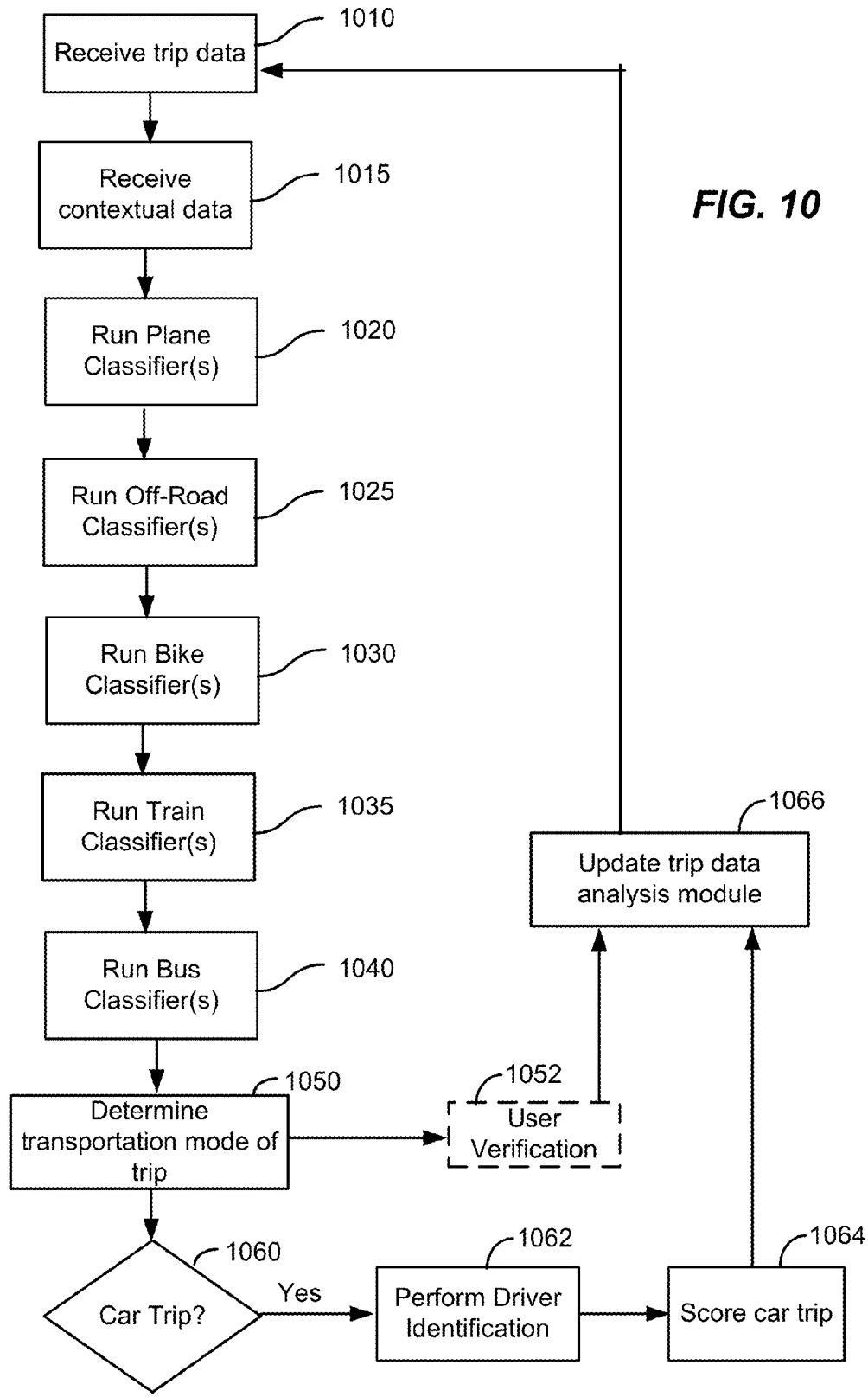
FIG. 10 is a simplified flowchart illustrating a method of determining a mode of transportation for a trip according to an embodiment of the present invention.

FIG. 10 is a simplified flowchart illustrating a method of determining a mode of transportation for a trip according to an embodiment of the present invention. As illustrated in FIG. 10, trip data is received (1010) along with contextual data on transportation systems in the vicinity of the user (1015). The trip data can be segmented or can be truncated to define a given trip. For example, as a user leaves their house, they may walk to a bus stop and then catch a bus. The velocity of the user will exceed a threshold greater than a walking speed as the bus begins moving at road speeds. A similar decrease in speed will be associated with the user exiting the bus. This increase in velocity and subsequent decrease in velocity can be utilized to remove the data from the walking phases, resulting in trip data that is closely aligned with the user riding the bus. As the user moves from a starting location to an ending location, a series of trips can be defined, each having unique trip data. Thus, trip data can be provided as data on a series of sub-trips. Trip extraction can be based on delays during which the user is stopped for a predetermined period of time, speed variations, and the like.

Using the contextual data, for example, the location of the bus stops and the route schedule, the initial data collected using the mobile device can be further truncated as appropriate, for example defining the start of the trip not only on speed variation, but the user being located at the bus stop at a time associated with the bus schedule and coincident with the increase in speed. One of ordinary skill in the art would recognize many variations, modifications, and alternatives.

The trip data can include location data on the location of the mobile device during a trip, accelerometer data during the trip, gyroscope data during the trip, and the like. The contextual data can include location data on the elements of the transportation modes, for example, locations of train tracks, roads, airport grounds, and the like. Analysis of the location data as a function of time can provide velocity or speed data. The contextual data can also include temporal data related to the transportation modes, including, for example, time schedules for trains, buses, and the like. One of ordinary skill in the art would recognize many variations, modifications, and alternatives.

It should be appreciated that the specific steps illustrated in FIG. 10 provide a particular method of determining a mode of transportation for a trip according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Given the trip data and the contextual data, a set of features can be computed for the trip data combined with the contextual data. As illustrated in FIG. 10, a set of classifiers are utilized to determine the probability that the trip data is associated with each of the various modes of transportation. The classifiers can include, but do not require, a plane classifier (1020), an off-road classifier (1025), a bicycle classifier (1030), a train classifier (1035), a bus classifier (1040), additional classifiers, or the like. The various classifiers can include multiple sub-classifiers. As an example, and as discussed below, three bus classifiers can be utilized in 1040 to provide a probability that the trip is taken on a bus. The output of the various sub-classifiers can be averaged, weighted, or the like to provide a probability for the given mode of transportation. Additional description related to the various classifiers is provided herein, specifically, with respect to FIGS. 11-16. Additional description related to determining the mode of transportation for the trip (1050) is provided in relation to FIG. 17. In addition to the classifiers illustrated in FIG. 10, other suitable classifiers for other modes of transportation, including motorcycle, and the like, can be integrated into the method illustrated in FIG. 10. One of ordinary skill in the art would recognize many variations, modifications, and alternatives.

In some implementations, data provided by the user, for example, that a particular trip is taken on a bus, can be utilized to train the bus classifier or other classifiers are appropriate. Referring to FIG. 10, after the mode of transportation is determined (1050), the user can optionally be prompted with the determined mode of transportation and asked to verify that the classification is correct (1052). Using this feedback, the trip data analysis module can be updated (1066). The trip data analysis module can include the various classifiers illustrated and discussed in FIG. 10. The updated trip data analysis module can then be utilized when future trip data is received (1010). As an example, when the trip is completed, the user can be sent a message through the user interface of the mobile device, e.g., a touch screen, that notifies the user that the just completed trip has been classified as a trip using a particular mode of transportation. The user can respond that the classification was correct or that the classification was incorrect, potentially providing the mode of transportation that was used, for example selecting an icon for bus travel to correct the determined mode of transportation. In other embodiments, the user selects a mode of transportation from a list as described below. This feedback will enable the classifiers to be updated to improve future system performance.

In some embodiments, the user verification process 1052 verifies that the trip was correctly classified, whereas in other embodiments, the user verification process 1052 enables the user to correct the classification associated with the trip, thereby providing inputs that can be used to update the trip data analysis module (1066), including updating the various classifiers discussed herein.

It should be appreciated that the specific steps illustrated in FIG. 10 provide a particular method of determining a mode of transportation for a trip according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20A:
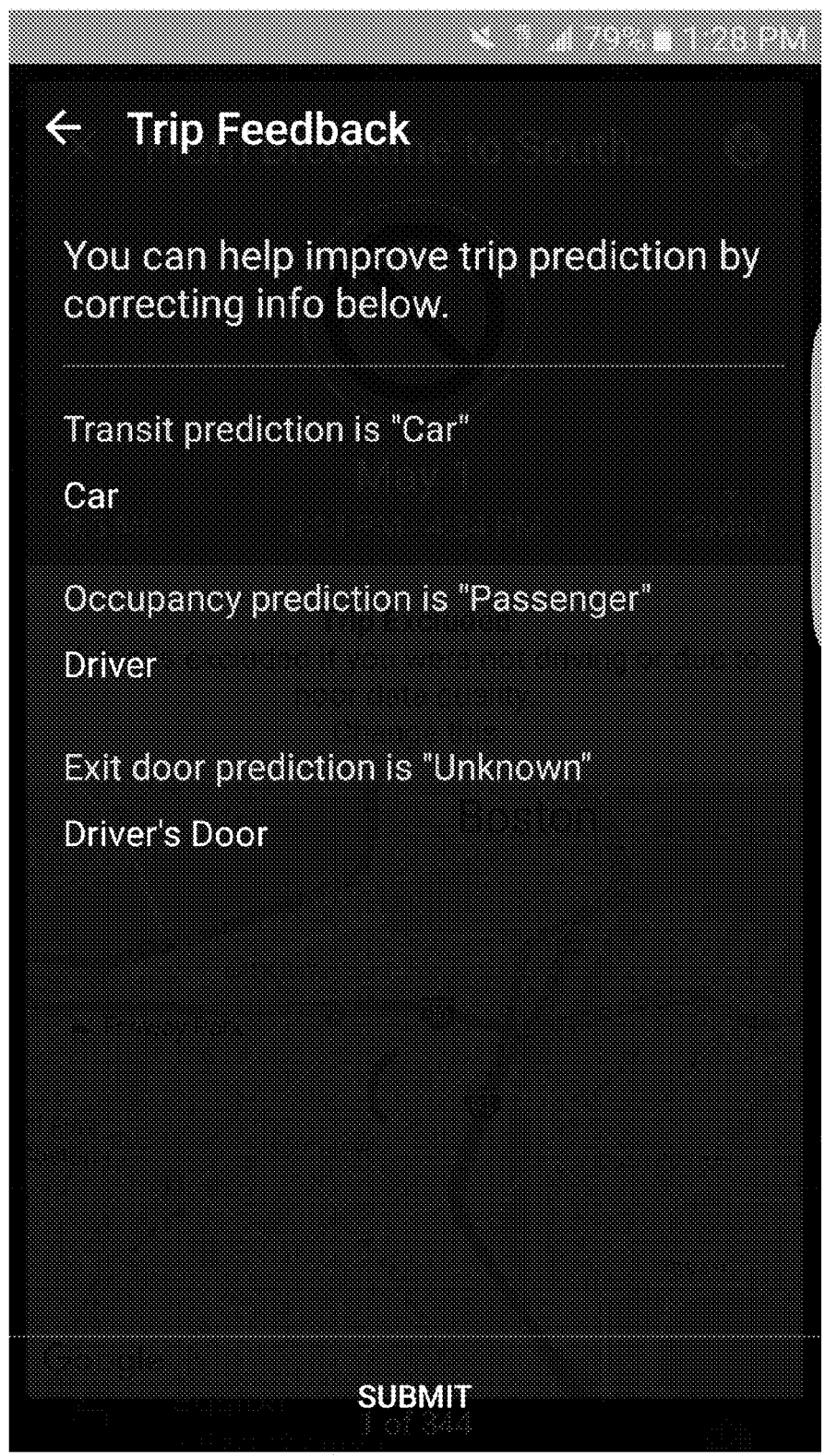
FIG. 20A is a simplified screenshot illustrating display of a classified transportation mode during a trip to a user according to an embodiment of the present invention.

FIG. 20A is a simplified screenshot illustrating display of a classified transportation mode during a trip to a user according to an embodiment of the present invention. As illustrated in FIG. 20A, the display of the mobile device is utilized to provide the user with information related to the trip and to enable a user to provide feedback on the classification of the transportation mode for the trip. In this example, the transportation mode determined by the system is a car. Below the determined mode of transportation, the user is presented with the first of a list of modes of transportation (i.e., a default response from a list). If the mode of transportation for the trip was not a car, the user can select the default value (e.g., car), which will then generate a list as described in relation to FIG. 20B. The user of the mobile device was the determined to be the passenger and Driver is the default value for a list of occupants. The exit door determination was unknown and the user is presented with Driver's Door as the default exit door. In this example, if the mode of transportation was a car, the user was the passenger, and the user exited through the passenger's door, then the user would select the Driver's Door default value, which would result in a list of exit doors being presented to the user, thereby enabling the user to select the particular exit door utilized during the trip as discussed below.

Thus, the user verification can extend to cover more than just the mode of transportation, but additional characteristics of the trip, including the occupant status as driver or passenger, the exit door, whether the occupant was seated in the front or back seat, and the like. As a result, the verification process can provide verification of a correct prediction for some characteristics of the trip and correction of incorrect predictions for other characteristics of the trip. One of ordinary skill in the art would recognize many variations, modifications, and alternatives.

Figure 20B:
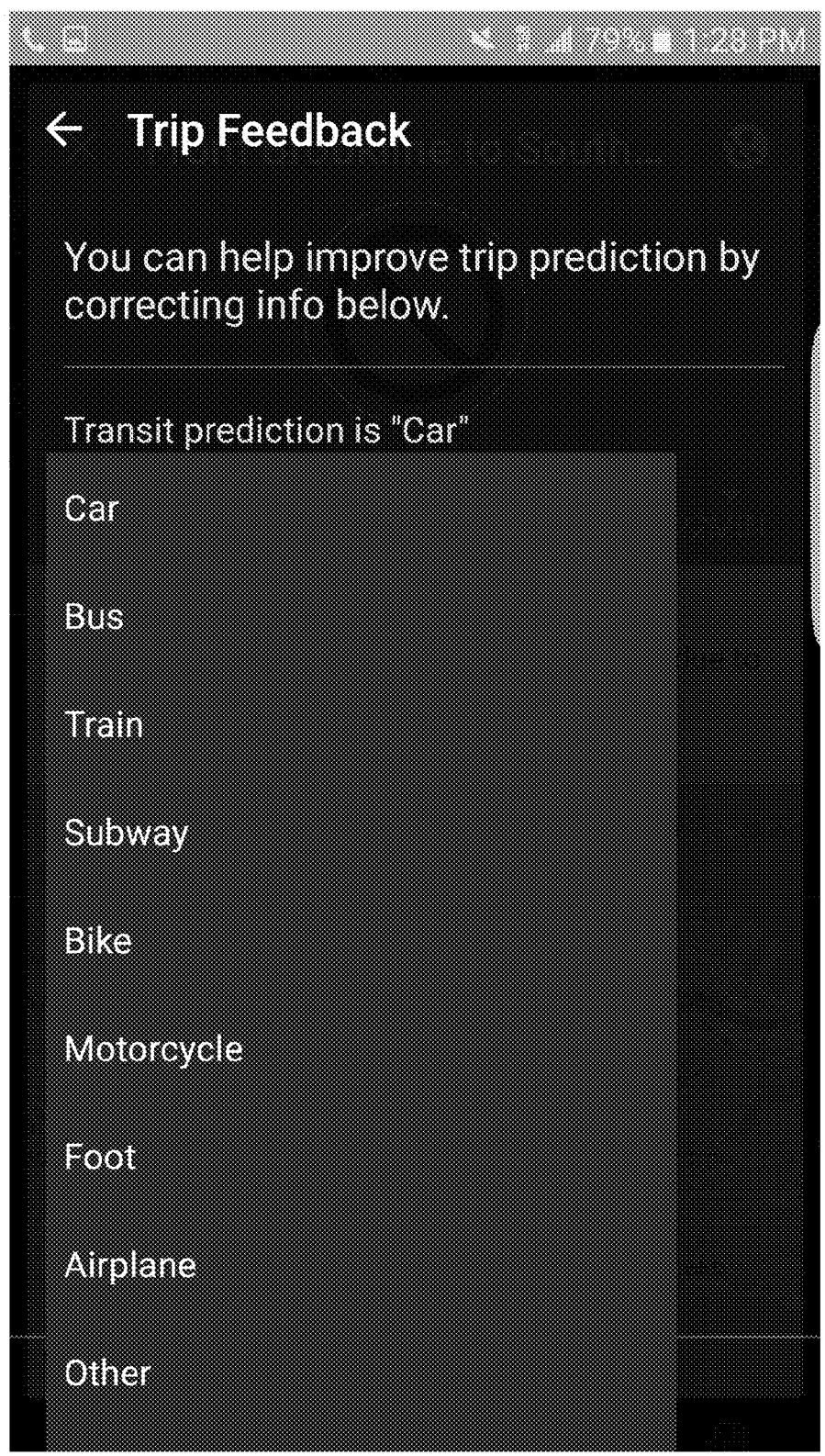
FIG. 20B is a simplified screenshot illustrating receipt of user feedback related to the classified transportation mode according to an embodiment of the present invention.

FIG. 20B is a simplified screenshot illustrating receipt of user feedback related to the classified transportation mode according to an embodiment of the present invention. In order for the user to provide feedback to the system, when the user selects the area marked as car under the determined transportation mode, the user is presented with a list of transportation modes in a pull-down menu. In this example, the user can select from car, bus, train, subway, bike, motorcycle, foot (walking), airplane, or other. Embodiments of the present invention are not limited to this particular list and other modes of transportation are included within the scope of the present invention. Similar pull-down menus are provided for the occupancy status of the user: driver/passenger, and the exit door: driver's door/passenger's door/rear driver's door/rear passenger's door, or the like.

If the trip is determined to be a car trip (1060), then the data collected during the trip can be utilized to perform driver identification (1062), score the driver's behavior during the trip (1064), or the like. Additional description related to performing driver identification and scoring of driver's behavior is provided in U.S. Provisional Patent Application No. 62/210,710, filed on Aug. 27, 2015, entitled "Methods and Systems for Presenting Collected Driving Data," 62/286,218, filed on Jan. 22, 2016, entitled "Systems and Methods for Detecting and Modifying Driving Behaviors," and 62/320,226, filed on Apr. 8, 2016, entitled "Systems and Methods for Individualized Driver Prediction," the disclosures of which are hereby incorporated by reference in their entirety for all purposes.

Figure 11:
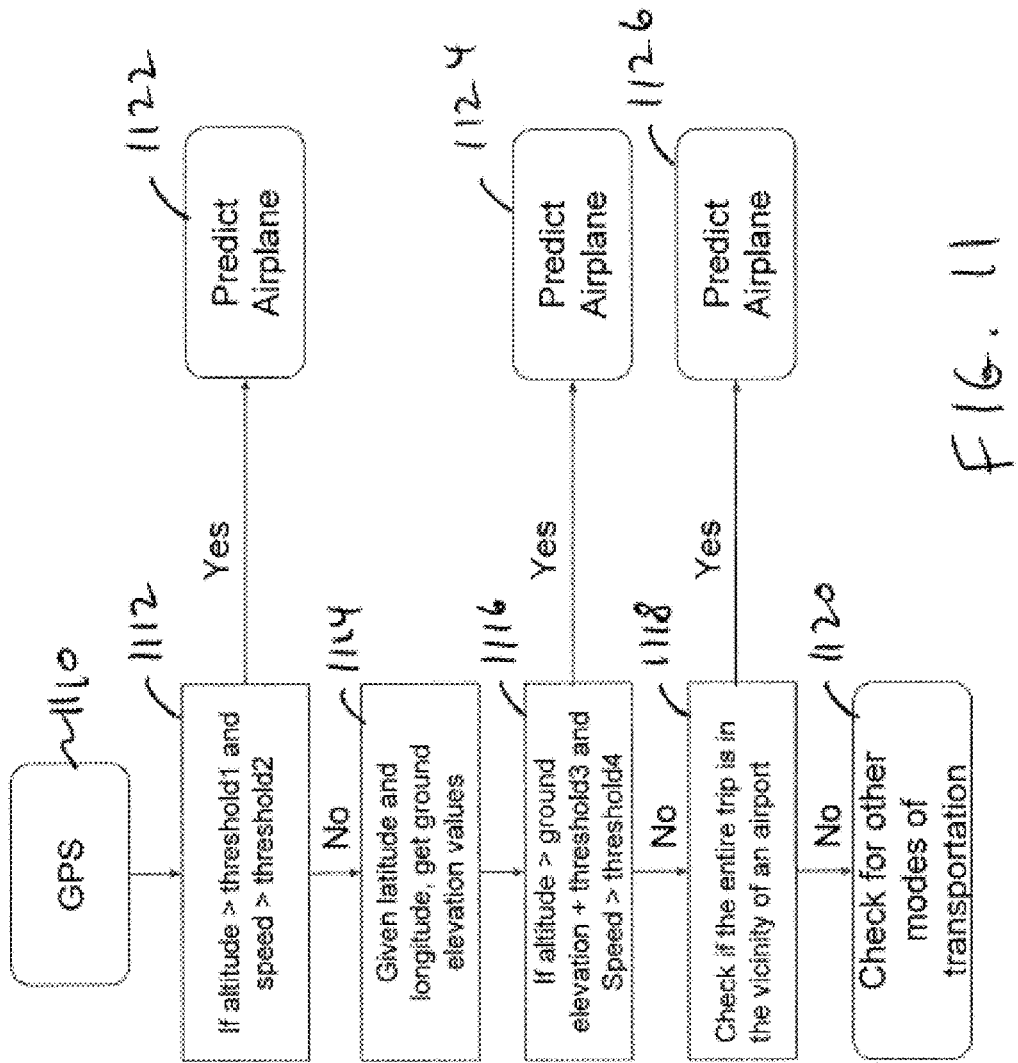
FIG. 11 is a simplified flowchart illustrating a method of operating a plane classifier according to an embodiment of the present invention.

FIG. 11 is a simplified flowchart illustrating a method of operating a plane classifier according to an embodiment of the present invention. As discussed in relation to 1020 in FIG. 10, a plane classifier is utilized to analyze the location and velocity information contained in the trip data, in conjunction with the contextual data, to determine if the trip is associated with a plane, also referred to as an airplane. The plane classifier receives location data collected using the mobile device, illustrated as GPS data (1110) in FIG. 11. The location data can include speed data derived from the location data as well as altitude data for the mobile device as a function of time during the trip. A determination is made if the altitude of the mobile device during the trip is greater than a first threshold (threshold$_1$) and if the speed of the mobile device is greater than a second threshold (threshold$_2$). For example, if the altitude is greater than 21,000 feet and the speed is greater than 100 m/s, then the classifier can classify the trip as a plane trip (1122). In some embodiments, the prediction illustrated in 1122 can be a transportation mode metric, e.g., an airplane metric, that provides a probability that the trip was taken using an airplane, for example, a probability tied to the amounts that the altitude and speed exceed the given thresholds. Similar transportation mode metrics can be generated at 1124 and 1126.

In some implementations, either the altitude or the speed is used, although the inventors have determined that in some cases, the altitude provided by the GPS can report altitudes that are higher than the actual altitude. In these cases, both the altitude and the speed are utilized to improve system performance.

If the altitude of the mobile device during the trip is less than the first threshold and if the speed of the mobile device is less than the second threshold, then the ground elevation values are determined given the latitude/longitude of the mobile device (1114). If the altitude of the mobile device during the trip exceeds the ground elevation for the latitude/longitude by more than a third threshold (threshold$_3$) and the speed of the mobile device is greater than a fourth threshold (threshold$_4$), then the classifier can classify the trip as a plane trip (1124). As an example, the third threshold could be in the range of 1,000 to 2,000 feet and the fourth threshold could be in the range of 25 to 75 m/s.

If both decision points 1112 and 1116 are negative, then the location of the mobile device during the trip is compared to locations within the vicinity of airports as defined in the contextual data (1118). As an example, geographic boundaries of airports can be provided in the contextual data and if the mobile device is inside this geographic boundary during the trip, then it is likely that the user is on a plane (1126).

If decision point 1118 is negative, then the method proceeds to analyze the trip data to determine if the trip is associated with other modes of transportation (1120). In FIG. 10, after the plane classifier is utilized (1020), the method proceeds to use the off-road classifier (1025).

It should be appreciated that the specific steps illustrated in FIG. 11 provide a particular method of operating a plane classifier according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
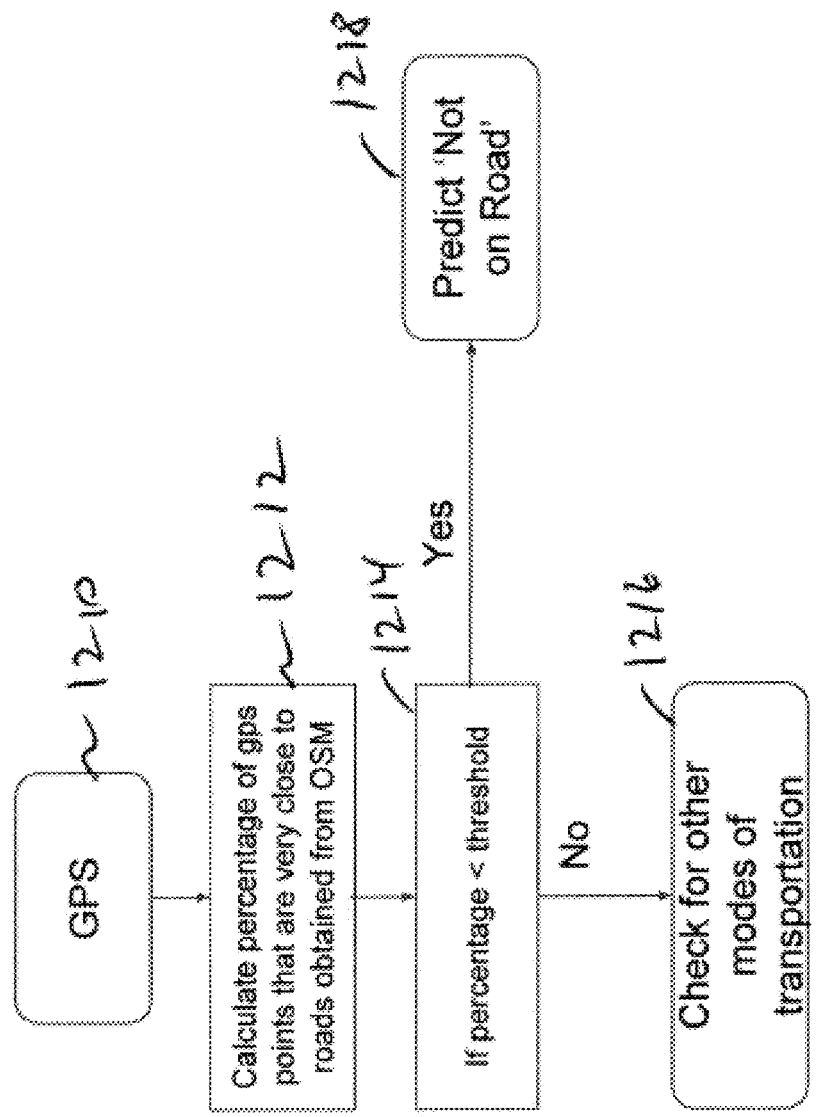
FIG. 12 is a simplified flowchart illustrating a method of operating an off-road classifier according to an embodiment of the present invention.

FIG. 12 is a simplified flowchart illustrating a method of operating an off-road classifier according to an embodiment of the present invention. As discussed in relation to 1025 in FIG. 10, an off-road classifier is utilized to analyze the location and velocity information contained in the trip data, in conjunction with the contextual data, to determine if the trip is not associated with a road, but is an off-road trip.

The off-road classifier receives location data collected using the mobile device, illustrated as GPS data (1210) in FIG. 12. The location data can include speed data derived from the location data. The off-road classifier computes the percentage of location data points that are within a predetermined distance of roads obtained from the contextual data, for example, obtained from OpenStreetMap (OSM). If the percentage is less than a threshold value (1214), then the classifier can predict that the trip is an off-road trip (1218). This classifier enables trips taken by boat, ferry, or the like, to be classified as not a driving trip.

If decision point 1214 is negative, then the method proceeds to analyze the trip data to determine if the trip is associated with other modes of transportation (1216). In FIG. 10, after the off-road classifier is utilized (1025), the method proceeds to use the bicycle classifier (1030).

It should be appreciated that the specific steps illustrated in FIG. 12 provide a particular method of operating an off-road classifier according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
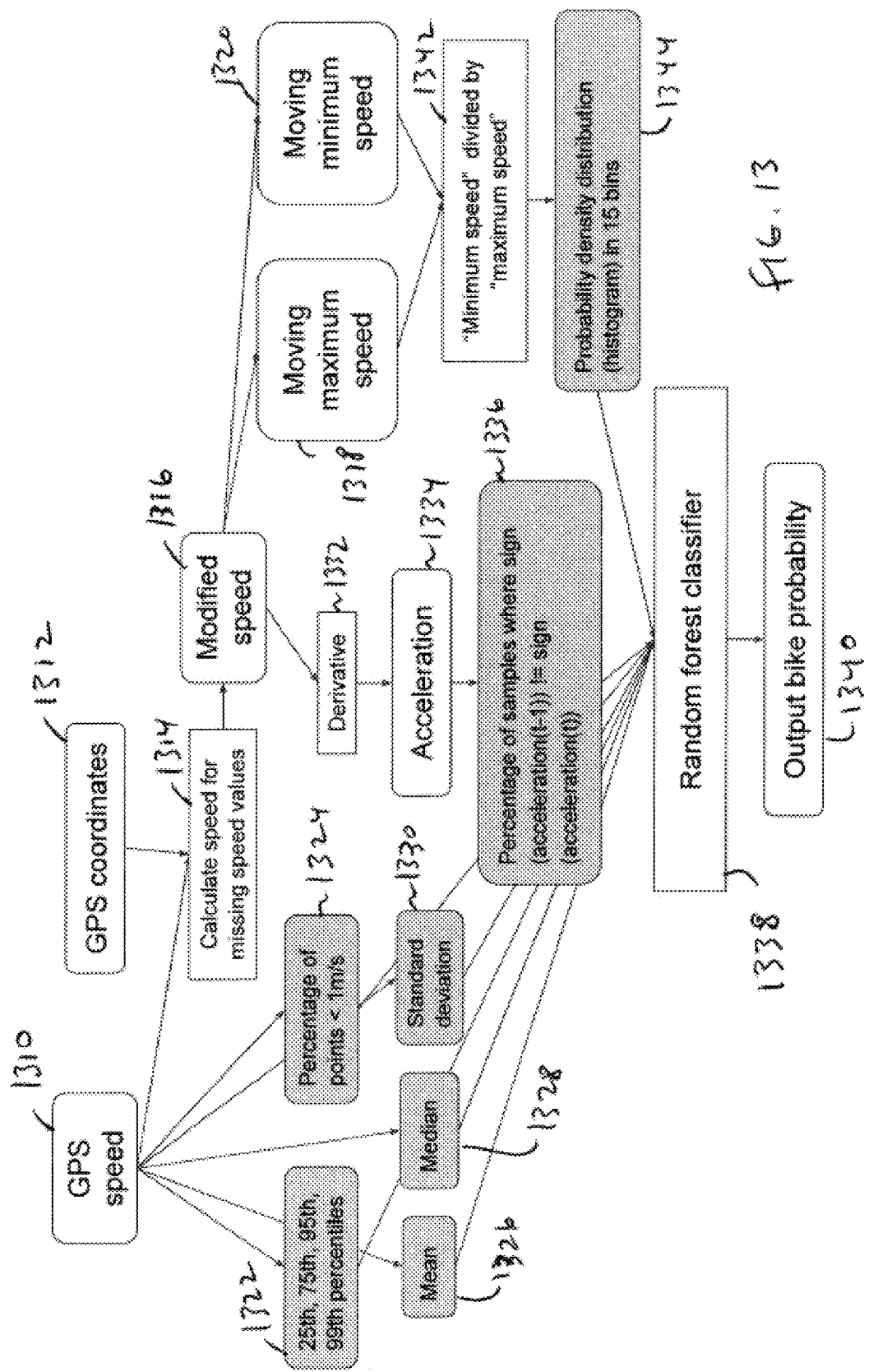
FIG. 13 is a simplified flowchart illustrating a method of operating a first bike classifier according to an embodiment of the present invention.

FIG. 13 is a simplified flowchart illustrating a method of operating a first bike classifier according to an embodiment of the present invention. As discussed in relation to 1030 in FIG. 10, a bike classifier is utilized to analyze the location and velocity information contained in the trip data, in conjunction with the contextual data, to determine if the trip is associated with a bicycle.

The bike classifier receives speed data collected using the location determination system of the mobile device, illustrated as GPS speed (1310) and GPS coordinates (1312) in FIG. 13. The speed data can be derived from location data measured using the mobile device. The speed data can be presented in a format in which the speed data at a specific time is referred to as a data point, for example, for a 1 Hz system and a one minute trip, 60 data points would be used. The speed data is binned into a predetermined number of percentiles (e.g., $25^{th}$, $75^{th}$, $95^{th}$, and $99^{th}$ percentiles) (1322). Additionally, the percentage of data points that have a speed of less than 1 m/s are determined (1324). A number of statistical measures are computed for the speed data, including the mean (1326), the median (1328), and the standard deviation (1330).

If the speed values are not realistic or erroneous, for example, negative, the speed data points that are erroneous, which can be referred to as missing data points, are calculated given the speed data and the location data represented by the GPS coordinates (1316). In other words, any speeds for which the speed values are less than zero usually indicates that the speed value couldn't be calculated based on the location data collected by the mobile device. Thus, these missing data points can be filled in to provide a complete speed profile for the trip. The speed between samples can be calculated by dividing the great circle distance (between one sample's coordinates and the next) by the time difference between both samples. In some embodiments, distance is measured in meters, time in seconds, speed in meters/second.

The speed of the mobile device as a function of time during the trip is provided by combining the missing data points with the original speed data (1316). Given this complete speed data set, both the acceleration and the velocity of the mobile device are analyzed. The derivative of the complete speed data for the trip is taken (1332) to provide an acceleration profile for the trip (1334). The acceleration profile is analyzed to determine the percentage of the samples for which the sign of the acceleration differs from a first time (t−1) to a second time (t) (1336). The inventors have determined that when cycling, the speed often shows small but high frequency decelerations and accelerations, which might arise from the pedaling cadence. Thus, embodiments of the present invention compute an acceleration signal as the derivative of the speed signal, and create a feature: the percentage of samples where sign (acceleration(t−1))≠sign(acceleration(t)). Thus, for a bicycle, it will be expected that the sign of the acceleration changes over time as a result of fluctuations in the acceleration profile and 1336 will provide insight into this behavior. In some cases, the complete speed data set is utilized to determine the metrics discussed in relation to 1322, 1324, 1326, 1328, and 1330. In these cases, the flow would be from 1316 to 1322, 1324, 1326, 1328, and 1330.

The complete speed data set for the mobile device is also analyzed to determine the maximum moving speed (1318) and the minimum moving speed (1320), for example, around a predetermined number of points during the trip. As an example, the maximum moving speed may be in the range of 10-30 mph, for example, 20 mph, and the minimum moving speed may be in the range 0-5 mph, for example, 0 mph. The minimum moving speed is divided by the maximum moving speed to provide a normalized speed (1342). At city driving speeds, which can be associated with either bikes or cars, a car stops more frequently than a bike. Secondly, at city driving speeds, a bike's speed is generally more stable (except for the high frequency acceleration sign switches mentioned above). In contrast with cars, which have a large ratio of the maximum speed to the minimum speed, bikes have a smaller ratio, resulting in a larger normalized value. A histogram (i.e., a probability density distribution) is formed for the normalized speed stream, using for example, 15 bins of normalized speed at the predetermined times defined by the predetermined number of points (1344).

In one implementation, for each GPS sample, the minimum speed is calculated over the current and the next 20 samples and this value is defined as the minimum speed (1320). For each GPS sample, the maximum speed is also calculated over the current and next 20 samples (+0.01 s) and this value is defined as the maximum speed (1318). The frequency of stopping and the general GPS speed stability is then captured in the histogram (1344), for example, with 15 equally sized bins between 0 and 1, calculated over the values of the ration of the minimum to maximum speed.

The data sets generated in 1322, 1324, 1326, 1328, 1330, 1336, and 1344 are input to a random forest classifier (1338), which generates a probability that the trip was taken by bicycle (1340). In some embodiments, the probability that the trip was taken using a bicycle is provided as a transportation mode metric that is utilized to determine which mode of transportation among a plurality of modes of transportation was taken during the trip.

It should be appreciated that the specific steps illustrated in FIG. 13 provide a particular method of operating a first bike classifier according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
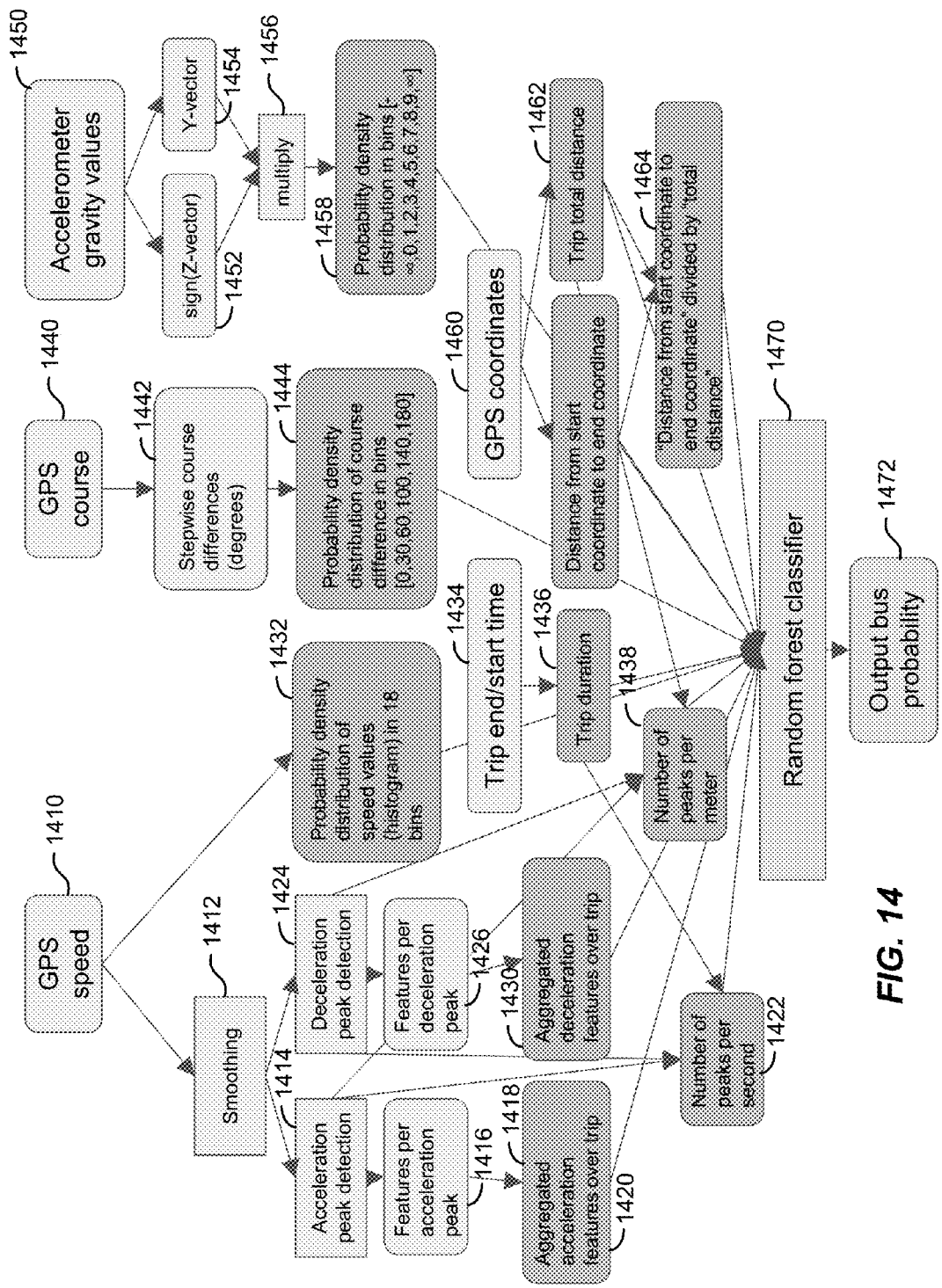
FIG. 14 is a simplified flowchart illustrating a method of operating a pattern-based bus classifier according to an embodiment of the present invention.

FIG. 14 is a simplified flowchart illustrating a method of operating a pattern-based bus classifier according to an embodiment of the present invention. As discussed in relation to 1040 in FIG. 10, a pattern-based bus classifier is utilized in an embodiment to analyze the location and velocity information contained in the trip data, in conjunction with the contextual data, to determine if the trip is associated with a bus.

Location data measured using the mobile device is obtained and includes speed data as a function of time during the trip, represented by GPS speed (1410), location data as a function of time during the trip, represented by GPS course (1440), accelerometer data as a function of time during the trip, represented by accelerometer gravity values (1450), and the location coordinate data, represented by GPS coordinates (1460). In some implementations, the acceleration values are determined based on the speed values. Each of these data streams is processed to provide inputs to a random forest classifier as described below.

The speed data is smoothed (1412) and peak accelerations from stationary (1414) and peak decelerations to stationary (1424) are detected for the trip. As an example, accelerations from stationary and decelerations to stationary are extracted from the speed signal to extract features from these acceleration/deceleration windows. The speed values can be smoothed (1412) using a Hanning window with window length 11. Acceleration points are then identified as any point at which the speed(t−1)<=a predetermined threshold, for example, 8 m/s and speed(t)>a second predetermined threshold, for example, 8 m/s. Deceleration points are points at which speed(t−1)>=a predetermined threshold, for example, 8 m/s and speed(t)<a second predetermined threshold, for example, 8 m/s. The start of an acceleration can be defined as the last value at which speed(t)<=speed(t−5) before the acceleration point, the end can be defined as the first value at which speed(t)>=speed(t+5). Of course, other time steps can be utilized to determine these start and end points. The deceleration start can be similarly defined as the last value at which speed(t)>=speed(t−5) before the deceleration point, the end can be defined as the first value at which speed(t)<=speed(t+5).

Various features are extracted for each detected acceleration peak and deceleration peak (1416 and 1426). These features can include: the difference between the peak's first speed value and last speed value, the peak duration in time, the distance traveled during the peak, and the average, skew and kurtosis of the acceleration values in the peak. Then the mean and standard deviation of these statistics over the accelerations and decelerations can be computed separately to use them as features of the trip. Thus, embodiments of the present invention provide an aggregated list of features for the acceleration/deceleration peaks during the trip.

The rate at which peaks are present in the trip data is an indicator of the mode of transportation, for example, bike or car or bus, and this rate is determined (1422). Additionally, the distance between peaks can be computed and added to the aggregated list of features. Moreover, the inventors have determined that the duration of stationary and driving periods between the acceleration and deceleration peaks are patterns for buses, cars, and the like. Therefore, some embodiments compute the mean and standard deviation of the stationary and moving periods as well as the total time that the mobile device is stationary or moving divided by the total trip duration.

The speed data is also used to generate a histogram of the speed values, for example a probability density distribution of speed in 18 bins (1432). As an example, the bins can be defined as speed bins (m/s) of [0, 2, 4, 6, 8, 10, 12, 14, 16, 18, 20, 22, 24, 26, 28, 30, 32, 34, 40]. Of course, other numbers of bins can be utilized according to the present invention. Using the speed data, the GPS location data, or other suitable data, the start and end times of the trip are determined (1434) and the trip duration is computed (1436).

Bus trips tend to proceed in a generally straight direction and do not usually proceed in a direction for a significant period that differs more than 90 degrees from the direction indicated by the line connecting the trip's start and the trip's end coordinates. To extract these features, embodiments of the present invention calculate this difference in direction at each of the GPS samples, then build a histogram counting how many times a difference occurs in the bins. Thus, the location/course data for the trip is used to compute a stepwise stream of course differences (measured in degrees) as a function of time during the trip (1442). As an example, as the course varies to the right and the left, this movement is tracked by course differences. Given the course differences as a function of time, a histogram of course differences is generated using a given number of bins, for example, bins of 0°-30°, 31°-60°, 61°-100°, 101°-140°, and 141°-180° (1444). As will be evident to one of skill in the art, other bin ranges can be utilized as appropriate to the particular application.

Figure 19:
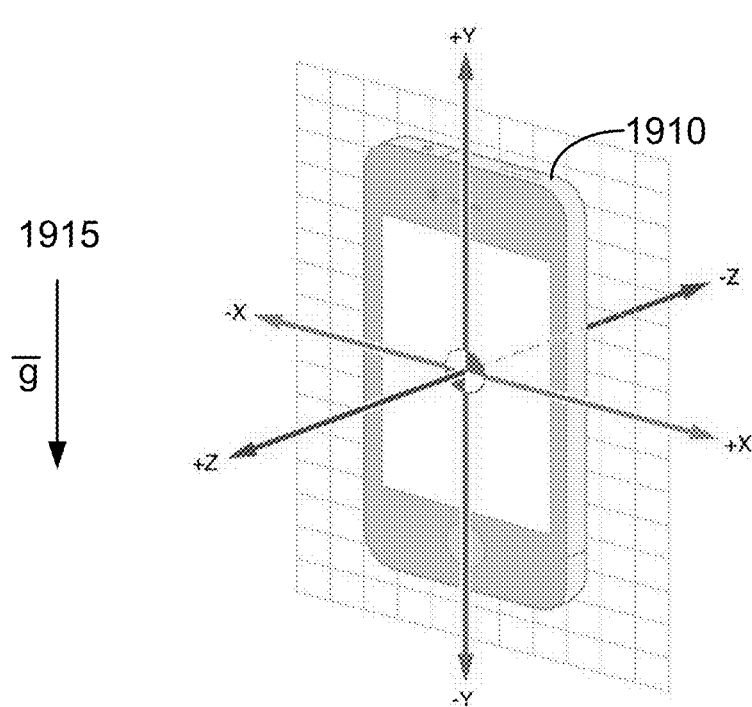
FIG. 19 is a simplified schematic diagram illustrating a reference frame for a mobile device according to an embodiment of the present invention.

FIG. 19 is a simplified schematic diagram illustrating a reference frame for a mobile device according to an embodiment of the present invention. As illustrated in FIG. 19, the mobile device 1910, which may be a smart phone, a tablet, or other portable electronic device, has a reference frame defined by axes x, y, and z. The acceleration due to gravity is represented by vector 1915, which can also be referred to as gravity vector $g=(g_x, g_y, g_z)$, which is in the mobile device's reference frame. The gravity vector norm (also in the mobile device's reference frame) is $g_{norm}=g/|g|$.

Additional description related to the gravity vector and modes of transportation is provided in U.S. patent application Ser. No. 15/149,603, filed on May 9, 2016 and U.S. patent application Ser. No. 15/149,613, filed on May 9, 2016, the disclosures of which are hereby incorporated by reference in its entirety for all purposes.

The inventors have determined that users often tend to move their mobile devices while riding on a bus, whereas mobile devices tend to stay stationary in a car. This movement is reflected in the mobile device's inclination throughout the trip.

The accelerometer data collecting using the mobile device, particularly, the accelerometer gravity values are utilized to determine the inclination/orientation of the mobile device during the trip. As an example, for a person on a bus, they may be reading text on their mobile device. The sign of $g_z$ is determined, where $g_z$ is the component of the gravity vector along the z-axis of the phone's reference frame. $g_y$ is also determined, where $g_y$ is the component of the gravity vector along the y-axis of the phone's reference frame.

The sign of $g_z$ is applied to $g_y$ (1456) to provide an indication if the mobile device is facing up or down along with the orientation of the mobile device. The values of $g_z{}^*g_y$ will be in the range of $-9.8$ m/s$^2$ to $+9.8$ m/s$^2$. A histogram of $g_z{}^*g_y$ is generated (in units of meters per second squared), for example in bins defined by $[-\infty, 0, 1, 2, 3, 4, 5, 6, 7, 8, 9, \infty]$ (1458).

The GPS coordinates as a function of time during the trip are used to compute the total trip distance (1462) and, using the distance from the start coordinate to the end coordinate (1446), the distance from the start coordinate to the end coordinate divided by the total trip distance is computed (1464). This straight line distance divided by the total trip distance provides a measure of the amount of deviation during the trip.

The values and arrays of values, for example, the probability density distributions, computed in 1420, 1422, 1430, 1432, 1436, 1438, 1444, 1446, 1458, 1462, and 1464 are input to a random forest classifier (1470), which generates a probability that the trip was taken using a bus (1472). In some embodiments, the probability that the trip was taken using a bus is provided as a transportation mode metric that is utilized to determine which mode of transportation among a plurality of modes of transportation was taken during the trip.

It should be appreciated that the specific steps illustrated in FIG. 14 provide a particular method of operating a pattern-based bus classifier according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
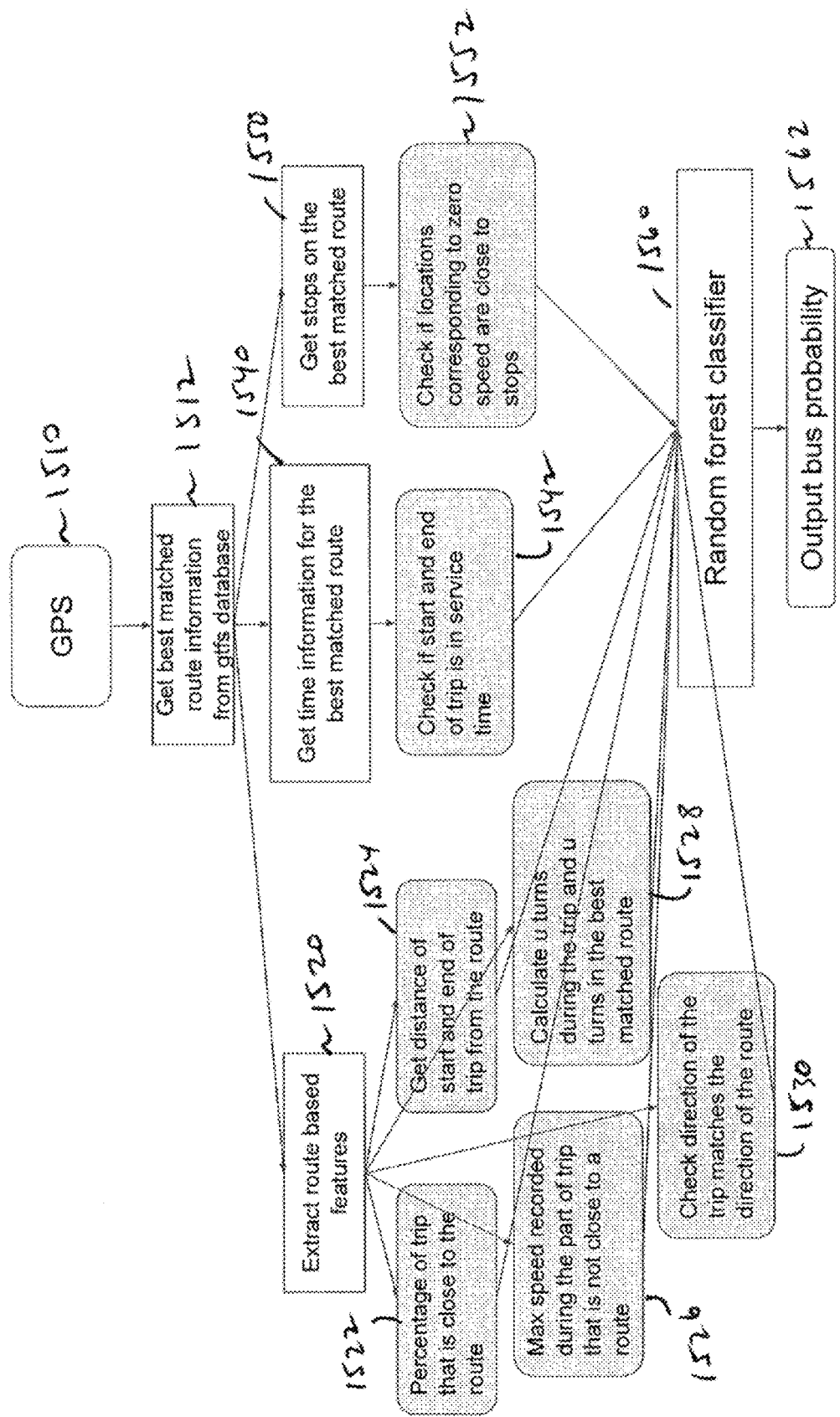
FIG. 15 is a simplified flowchart illustrating a method of operating a General Transit Feed Specification (GTFS)-based bus classifier according to an embodiment of the present invention.

FIG. 15 is a simplified flowchart illustrating a method of operating a General Transit Feed Specification (GTFS)-based bus classifier according to an embodiment of the present invention. In addition to the pattern-based bus classifier discussed in relation to FIG. 14, a GTFS-based bus classifier can be utilized in an alternative embodiment to analyze the location and velocity information contained in the trip data, in conjunction with the contextual data, to determine if the trip is associated with a bus.

As discussed above, the contextual data can include public transportation schedules and associated geographic information, which can be provided in the GTFS format. The system receives location data characterizing the trip, represented by GPS data (1510) and the best matched route is determined based on information on routes in the vicinity of the mobile device, obtained, for example, from a GTFS database (1512).

Route based features are extracted from the route information (1520). These features can include a number of metrics related to the trip, including the percentage of the trip that is close to the best matched route (1522), the distance of the start point of the trip from the best matched route and the distance of the end point of the trip from the best matched route (1524), the maximum speed recorded during portions of the trip that are more than a predetermined distance from the matched route, for example 30 feet, from the best matched route (1526), and the number of U-turns made during the trip and the number of U-turns in the best matched route (1528). The direction of the trip, for example, the general direction from north to south) of the trip is compared to the direction of the best matched route to determine the correlation between these directions (1530).

Given the best matched route, the time information for the best matched route is obtained (1540). The start time at which the route begins in the morning and the stop time at which the route terminates in the evening/night is compared to the start and end times of the trip to determine if the trip time is inside or outside the service times for the best matched route (1542). In addition to route start and end times, the locations at which stops are made along the best matched route are determined (1550). The locations at which stops are made (e.g., bus stops, train stations, etc.) are compared to the locations corresponding to zero speed during the trip to determine the correlation between the route stop locations and the trip stop locations (1552).

In some embodiments, the temporal aspects of the best matched route are compared to the temporal aspects of the trip. However, in some embodiments, this is optional since delays in public transport can often cause large differences between the scheduled times and the actual times at which the route starts and stops. One of ordinary skill in the art would recognize many variations, modifications, and alternatives.

The values, arrays of values, binary outputs, and the like computed in 1522, 1524, 1526, 1528, 1530, 1542, and 1552 are input to a random forest classifier (1560), which generates a probability that the trip was taken using a bus (1562). In some embodiments, the probability that the trip was taken using a bus is provided as a transportation mode metric that is utilized to determine which mode of transportation among a plurality of modes of transportation was taken during the trip.

It should be appreciated that the specific steps illustrated in FIG. 15 provide a particular method of operating a General Transit Feed Specification (GTFS)-based bus classifier according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
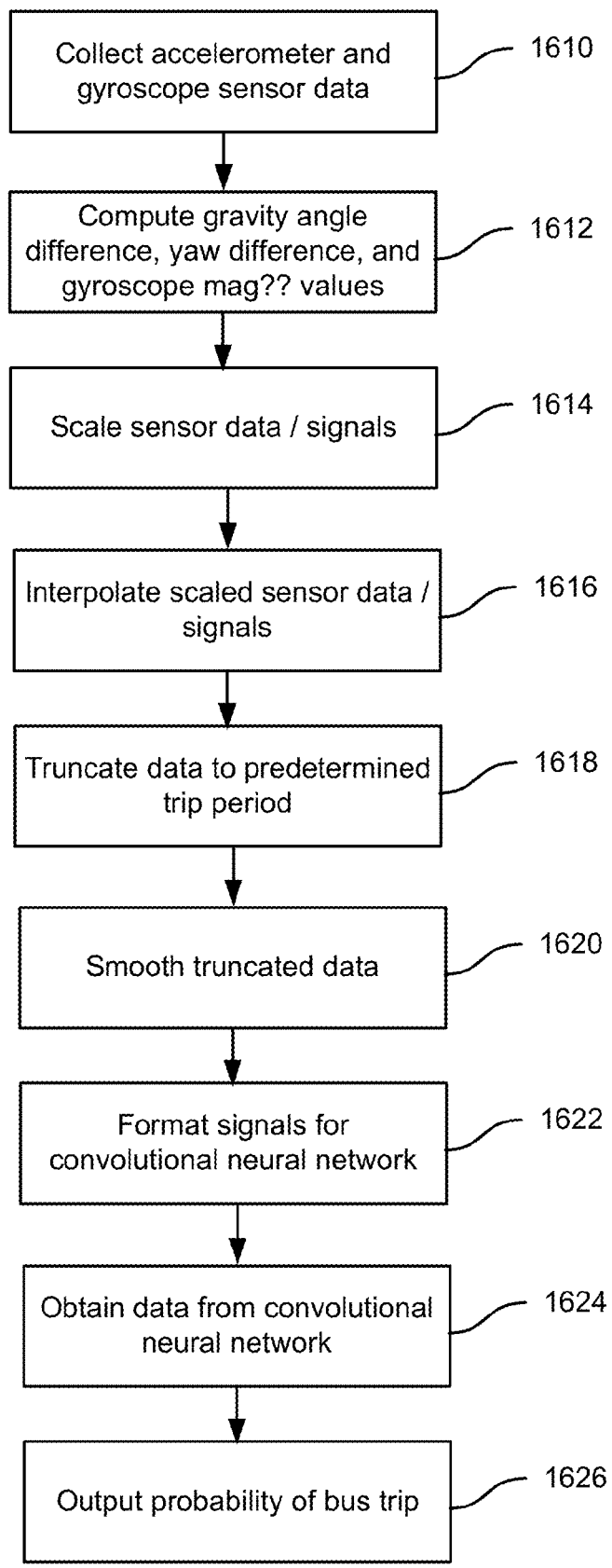
FIG. 16 is a simplified flowchart illustrating a method of operating a convolution network bus classifier according to an embodiment of the present invention.

FIG. 16 is a simplified flowchart illustrating a method of operating a convolutional neural network bus classifier according to an embodiment of the present invention. In addition to the pattern-based bus classifier discussed in relation to FIG. 14 and the GTFS-based bus classifier discussed in relation to FIG. 15, a bus classifier utilizing a convolutional neural network can be utilized in another alternative embodiment to analyze the location and velocity information contained in the trip data, in conjunction with the contextual data, to determine if the trip is associated with a bus.

Accelerometer data and gyroscope data are collected using the mobile device (1610). Several sensor data metrics are computed using the accelerometer and gyroscope data (1612). As illustrated in FIG. 16, the difference in the angle between the normalized gravity vector measured at two time steps is computed as the gravity angle difference for the time steps during the trip. The yaw difference is calculated as the first difference of the yaw signal (e.g., yaw(t)−yaw(t−1)), with yaw measured as the rotation (in angle) of the mobile device around the gravity vector. The magnitude of the gyroscope measurement (Gyro_mag) is computed as the square root of the sum of the squares of the gyroscope x, y, and z, components:

$$Gyro_{mag} = \sqrt{gyro_x^2 + gyro_y^2 + gyro_z^2}.$$

The sensor data metrics are scaled by computing the mean and the standard deviation, for example, scaling the metrics as (metric−mean)/standard deviation (1614). In order to provide data at a desired frequency, the scaled metrics are optionally interpolated to provide signals at a desired frequency, for example, 9 Hz (1616). Other frequencies can be utilized or the data can be utilized at the original collection rate.

The data is then truncated to a predetermined trip period, for example, 120 seconds (1618). In some embodiments, the predetermined trip period lies near the end of the trip, for example, a time range from the end time of the trip less 120 seconds to the end time of the trip.

The truncated data can be smoothed (1620), for example, by using a $2^{nd}$ order Savitzky-Golay filter with a window length of a predetermined number of samples (for example, 21 samples). In order to place the data in condition for processing by a convolutional neural network, the data can be formatted in the following format: [number of samples, number of channels, number of rows, number of columns], for example, [1, 1, 3, 1081] (1622). A convolutional neural network is then used to process the formatted data to provide a probability that the trip is associated with a bus (1624).

It should be appreciated that the specific steps illustrated in FIG. 16 provide a particular method of operating a convolutional neural network bus classifier according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
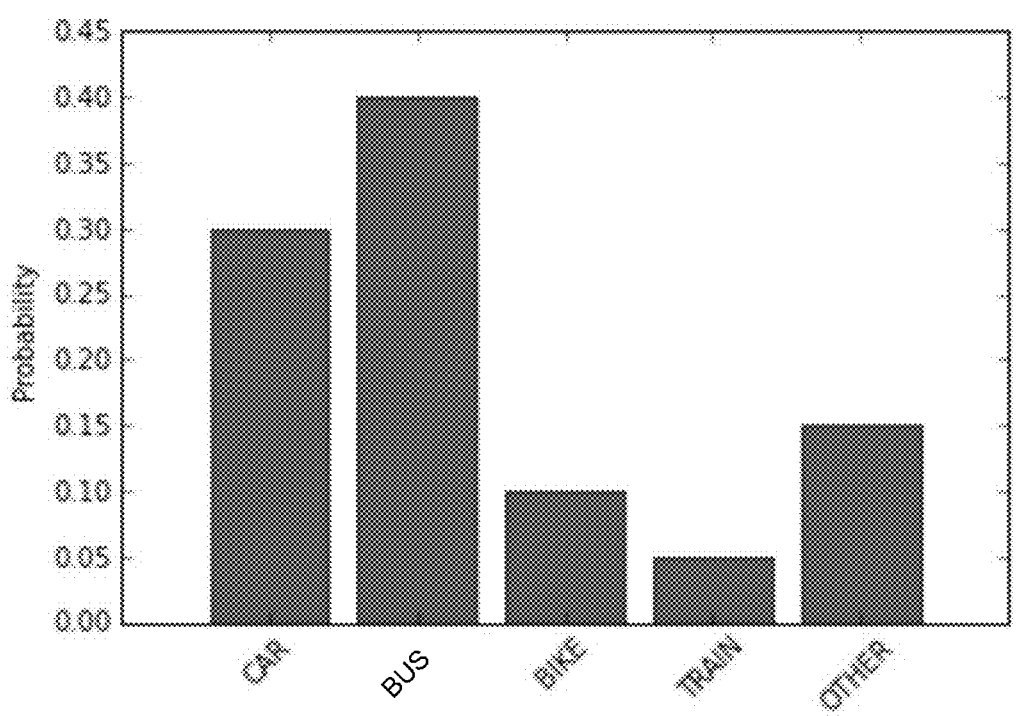
FIG. 17 is a simplified plot illustrating outputs of the transportation mode classifiers according to an embodiment of the present invention.

FIG. 17 is a simplified plot illustrating outputs of the transportation mode classifiers according to an embodiment of the present invention. As discussed in relation to 1055 in FIG. 10, the analysis of the trip data provides a probability value for each of the particular modes of transportation that were analyzed, for example, plane as a mode of transportation, off-road as a mode of transportation, bicycle as a mode of transportation, train as a mode of transportation, and bus as a mode of transportation. In this example, the probability of the trip being associated with a car was 30% (e.g., the transportation mode metric associated with the trip being taken using a bicycle is 30%) while the probability of the trip being associated with a bus was 40% (e.g., the transportation mode metric associated with the trip being taken using a bus is 30%). Other modes of transportation (e.g., bicycle and train) were lower in probability (e.g., have lower transportation mode metrics). Thus, for this trip, a determination can be made that the trip was taken using a bus, based on the bus classifier providing a higher probability for the trip than the other classifiers. In other words, the mode of transportation during the trip is classified as one of a plurality of modes of transportation based on determining the greater of the first transportation mode metric, the second transportation mode metric, or other transportation mode metrics among a plurality of transportation mode metrics, each associated with one of a plurality of transportation modes.

In some embodiments, multiple modes of transportation are combined based on the outputs of the various classifiers. As an example, subway and bus modes of transportation can be combined into a public transportation mode of transportation, thereby indicating that the trip data should not be used to measure the driving behavior of the user since the user was not driving during this trip.

Figure 18:
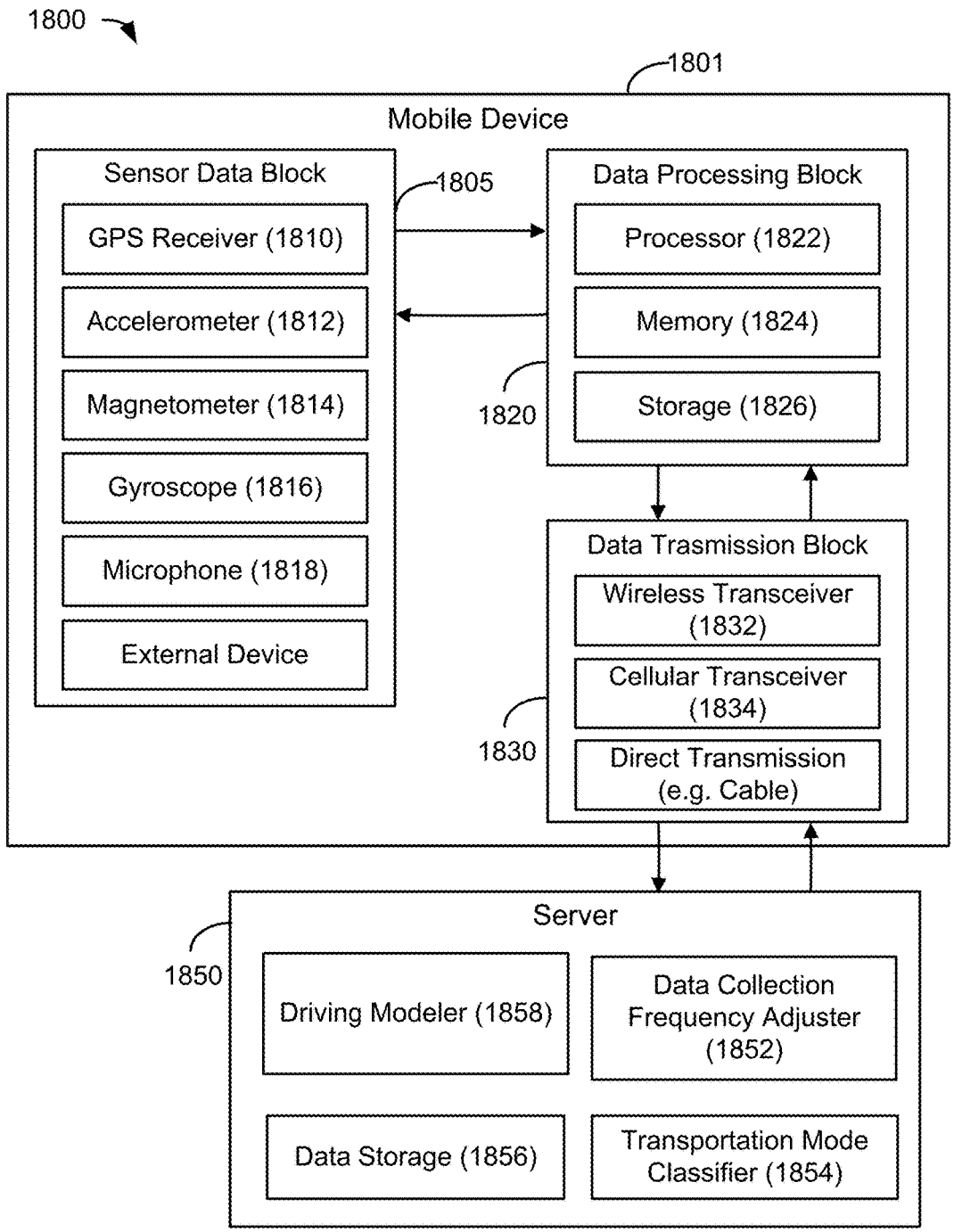
FIG. 18 is a simplified schematic diagram illustrating a motion sensor based transportation mode analysis system according to an embodiment of the present invention.

FIG. 18 is a simplified schematic diagram illustrating a motion sensor based transportation mode analysis system according to an embodiment of the present invention. The system illustrated in FIG. 18 can be utilized to collect trip data, also referred to as driving data as described herein. System 1800 includes a mobile device 1801 having a number of different components. Mobile device 1801, which can be a mobile phone, includes a sensor data block 1805, a data processing block 1820, and a data transmission block 1830. The sensor data block 1805 includes data collection sensors as well as data collected from these sensors that are available to mobile device 1801. This can include external devices connected via Bluetooth, USB cable, and the like. The data processing block 1820 includes storage 1826, and manipulations done to the data obtained from the sensor data block 1805. This includes, but is not limited to, subsampling, filtering, reformatting, etc. Data transmission block 1830 includes any transmission of the data off the mobile device to an external computing device that can also store and manipulate the data obtained from sensor data block 1805.

Embodiments of the present invention provide a system for collecting trip data in terms of mobile devices, and embodiments of the present invention are not limited to any particular mobile device. As examples, a variety of mobile devices including sensors such as one or more accelerometers 1812, gyroscopes 1816, location determination systems 1810 such as global positioning system (GPS) receivers, communications capabilities, and the like are included within the scope of the invention. Example mobile devices include mobile phones, smart watches, fitness monitors, Bluetooth headsets, tablets, laptop computers, movement analysis devices, and other suitable devices. One of ordinary skill in the art would recognize many variations, modifications, and alternatives.

The system for collecting trip data also can include a server 1850 that communicates with the mobile device 1801. The server 1850 provides functionality including data collection frequency adjuster 1852, driving model builder 1858, and transportation mode classifier 1854 as discussed in relation to FIG. 10 and related figures. The transportation mode classifier 1854 can be referred to as a trip data analysis module and can utilize the various classifiers discussed herein. Utilizing data collected by the sensors, the particular mode of transportation utilized by the user during a trip can be determined. In some embodiments, analysis of the data collected using the sensors during the trip is utilized to update the classifiers included in the transportation mode classifier 1854. These components are executed by processors (not shown) in conjunction with memory (not shown). Server 1850 also includes data storage 1856.

To collect data associated with the driving behavior of a driver, one or more sensors on mobile device 1801 (e.g., the sensors of sensor data block 1805) are operated close in time to a period when mobile device 1801 is with the driver when operating a vehicle—also termed herein "a drive." With many mobile devices 1801, the sensors used to collect data are components of the mobile device 1801, and use power resources available to mobile device 1801 components, e.g., mobile device battery power and/or a data source external to mobile device 1801.

It should be noted that although some methods are illustrated in terms of only using location (e.g., GPS) data, embodiments of the present invention can also utilize accelerometer data in conjunction with the location data. In some implementations, the processes are begun with location data and the accelerometer data is used to supplement the location data.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A mobile-device-based system for classifying a mode of transportation during a trip, the system comprising:
   a mobile device including a location detection system and an accelerometer, wherein the mobile device is configured to collect trip data and acceleration data during the trip; and
   a data processing block comprising a processor and memory, wherein the memory includes instructions stored thereon that, when executed by the processor, cause the data processing block to perform the steps of:
   receiving the trip data from the mobile device;
   receiving contextual data related to a plurality of transportation systems;
   processing the trip data and at least a first portion of the contextual data using a first transportation mode classifier associated with a first of the plurality of transportation systems, wherein the first of the plurality of transportation systems includes driving by a user of the mobile device;
   processing the trip data and at least a second portion of the contextual data using a second transportation mode classifier associated with a second of the plurality of transportation systems;
   receiving a first transportation mode metric from the first transportation mode classifier, wherein the first transportation mode metric is a probability of driving by the user of the mobile device;
   receiving a second transportation mode metric from the second transportation mode classifier, wherein the second transportation mode metric is a probability of use of the second of the plurality of transportation systems by the user of the mobile device;
   classifying the mode of transportation during at least a portion of the trip as driving by the user based on the greater of the first transportation mode metric with respect to the second transportation mode metric;
   responsive to classifying the mode of transportation during at least the portion of the trip as driving by the user, analyzing a driving behavior of the user using at least a portion of the trip data corresponding to at least the portion of the trip;
   displaying the classified mode of transportation to the user;
   receiving a verification of the classified mode of transportation from the user; and
   updating at least one of the first transportation mode classifier or the second transportation mode classifier based on the received verification.

2. The system of claim 1 wherein the mobile device comprises a smart phone and the location determination system comprises a GPS system.

3. The system of claim 1 wherein the contextual data comprises General Transit Feed Specification (GTFS) data.

4. The system of claim 1 wherein the second of the plurality of transportation systems is at least one of a train, a bus, or an airplane.

5. The system of claim 1, wherein the trip data includes measured stops during the trip, wherein at least the second portion of the contextual data includes planned stops related to the second of the plurality of transportation systems, and wherein processing the trip data and at least the second portion of the contextual data includes comparing the measured stops to the planned stops.

6. The system of claim 5, wherein comparing the measured stops to the planned stops includes calculating a distance between the measured stops and the planned stops.

7. The system of claim 5, wherein comparing the measured stops to the planned stops includes comparing a timing of the measured stops to the planned stops.

8. The system of claim 1, wherein the data processing block further performs the step of:
   segmenting the trip data into a first segment that is processed with at least the first portion of the contextual data, and a second segment that is processed with at least the second portion of the contextual data.

9. The system of claim 8, wherein the trip data is segmented into the first segment and the second segment by identifying a transition point between the first segment and the second segment, wherein the transition point indicates a change in the mode of transportation.

10. The system of claim 1, wherein the data processing block further performs the step of:
    discarding an additional portion of the trip data not corresponding to at least the portion of the trip.

11. The system of claim 1, wherein the contextual data includes a loss of signal from the mobile device.

12. The system of claim 1, further comprising:
    responsive to classifying the mode of transportation during at least the portion of the trip as driving by the user, receiving the trip data from the mobile device at an increased frequency.

13. The system of claim 1, wherein the trip data includes location data, wherein at least the second portion of the contextual data includes route data related to the second of the plurality of transportation systems, and wherein processing the trip data and at least the second portion of the contextual data includes correlating the location data to the route data.

14. The system of claim 1, wherein the trip data includes mobile device speed data, wherein at least the second portion of the contextual data includes transportation speed data related to the second of the plurality of transportation systems, and wherein processing the trip data and the at least the second portion of the contextual data includes comparing the mobile device speed data to the transportation speed data.

15. The system of claim 1, wherein the contextual data includes schedule data related to the plurality of transportation systems.

* * * * *